US010498246B2

(12) United States Patent
Shimura et al.

(10) Patent No.: US 10,498,246 B2
(45) Date of Patent: Dec. 3, 2019

(54) POWER SUPPLY APPARATUS AND IMAGE FORMING APPARATUS

(71) Applicant: CANON KABUSHIKI KAISHA, Tokyo (JP)

(72) Inventors: Yasuhiro Shimura, Yokohama (JP); Hiroki Asano, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/183,447

(22) Filed: Nov. 7, 2018

(65) Prior Publication Data

US 2019/0149054 A1    May 16, 2019

(30) Foreign Application Priority Data

Nov. 14, 2017  (JP) .................. 2017-219285

(51) Int. Cl.
*H02M 3/338* (2006.01)
*H02M 3/335* (2006.01)
*G03G 15/00* (2006.01)
*H02M 1/00* (2006.01)
(Continued)

(52) U.S. Cl.
CPC ........ *H02M 3/33569* (2013.01); *G03G 15/80* (2013.01); *H02M 3/33515* (2013.01); *H02M 1/08* (2013.01); *H02M 2001/0006* (2013.01); *H02M 2001/0022* (2013.01); *H02M 2001/0025* (2013.01); *H02M 2001/0035* (2013.01);
(Continued)

(58) Field of Classification Search
CPC ........... H02M 7/5359; H02M 3/33569; H02M 2001/0022; H02M 2001/0045; G03G 15/00; G03G 15/80

USPC ................... 363/17–20, 21.02, 21.08, 21.12, 363/21.16–21.18, 49, 89; 323/222, 224, 323/282–290
See application file for complete search history.

(56) References Cited

U.S. PATENT DOCUMENTS 4,460,951 A * 7/1984 Fenter ............... H02M 1/36
                                                  323/901
5,786,687 A * 7/1998 Faulk ................ H02M 3/155
                                                  323/289
(Continued)

FOREIGN PATENT DOCUMENTS

JP        2008-299292      12/2008

OTHER PUBLICATIONS

U.S. Appl. No. 16/141,355, filed Sep. 25, 2018, by Hiroki Asano.
(Continued)

*Primary Examiner* — Rajnikant B Patel
(74) *Attorney, Agent, or Firm* — Venable LLP

(57) ABSTRACT

The power supply apparatus includes a transformer, at least one switching element provided on a primary side of the transformer and configured to perform a switching operation to output an output voltage from a secondary side of the transformer, and a control unit configured to determine a turn-on time of a pulse signal for controlling the switching element for each of first cycles, and perform a predetermined control in which a change value of the turn-on time of the pulse signal for each of second cycles each including the first cycles becomes smaller than a change value of the turn-on time of the pulse signal for each of the first cycles, to change the second cycle depending on operation states.

19 Claims, 12 Drawing Sheets

(51) Int. Cl.
*H02M 1/08* (2006.01)
*H02M 1/34* (2007.01)

(52) U.S. Cl.
CPC ............... *H02M 2001/0045* (2013.01); *H02M 2001/0058* (2013.01); *H02M 2001/342* (2013.01)

(56) References Cited

U.S. PATENT DOCUMENTS

| | | | | |
|---|---|---|---|---|
| 6,639,811 | B2* | 10/2003 | Hosotani | H02M 3/3385 363/19 |
| 9,641,061 | B2* | 5/2017 | Kawamura | H02M 3/33523 |
| 9,692,317 | B2* | 6/2017 | Le | H02M 7/06 |
| 9,823,617 | B2 | 11/2017 | Shimura | |
| 9,897,964 | B2 | 2/2018 | Shimura | |
| 9,966,865 | B2 | 5/2018 | Shimura | |
| 10,139,770 | B2* | 11/2018 | Shimura | G03G 15/80 |
| 2006/0285366 | A1* | 12/2006 | Radecker | H02M 3/33507 363/16 |
| 2009/0001944 | A1* | 1/2009 | Kim | H02M 1/36 323/238 |
| 2018/0212508 | A1 | 7/2018 | Kobayashi | |
| 2018/0316269 | A1 | 11/2018 | Shimura | |
| 2019/0020268 | A1 | 1/2019 | Saito | |

OTHER PUBLICATIONS

U.S. Appl. No. 16/058,289, filed Aug. 8, 2018, by Yasuhiro Shimura.
U.S. Appl. No. 16/057,636, filed Aug. 7, 2018, by Yasuhiro Shimura.
U.S. Appl. No. 16/058,280, filed Aug. 8, 2018, by Hiroki Asano.

* cited by examiner

FIG. 2

| | | \multicolumn{8}{c|}{BINARY DIGIT} | DECIMAL DIGIT |
|---|---|---|---|---|---|---|---|---|---|---|
| | | 1bit | 2bit | 3bit | 4bit | 5bit | 6bit | 7bit | 8bit | |
| (i) | AD CONVERSION VALUE OF FB TERMINAL VOLTAGE | 0 | 1 | 0 | 0 | 1 | 0 | 1 | 0 | 74 |
| (ii) | CORRECTION VALUE BASED ON ACV TERMINAL VOLTAGE | 0 | 0 | 0 | 1 | 1 | 1 | 0 | 1 | 29 |
| (iii) | CONTROL VALUE OF ON WIDTH OF CONTROL SIGNAL DS1 | 0 | 0 | 1 | 0 | 1 | 1 | 0 | 1 | 45 |
| (iv) | TURN-ON WIDTH OF CONTROL SIGNAL DS1 (BEFORE ERROR PROPAGATION) | 0 | 0 | 1 | 0 | 1 | 1 | | | 11 |
| (v) | REMAINDER VALUE | | | | | | | 0 | 1 | 1 |
| (vi) | CARRY-OVER VALUE OF PREVIOUS CALCULATION | | | | | | | 1 | 1 | 3 |
| (vii) | SUMMATION VALUE OF CARRY-OVER VALUE OF PREVIOUS CALCULATION AND REMAINDER VALUE | | | | | | 1 | 0 | 0 | 4 |
| (viii) | ERROR PROPAGATION VALUE | | | | | | 1 | | | 1 |
| (ix) | CARRY-OVER VALUE | | | | | | | 0 | 0 | 0 |
| (x) | TURN-ON WIDTH OF CONTROL SIGNAL DS1 (AFTER ERROR PROPAGATION) | 0 | 0 | 1 | 1 | 0 | 0 | | | 12 |

FIG. 8

| | | BINARY DIGIT | DECIMAL DIGIT |
|---|---|---|---|

(i) CONTROL VALUE OF ON WIDTH OF CONTROL SIGNAL DS1

| 1bit | 2bit | 3bit | 4bit | 5bit | 6bit | 7bit | 8bit | 9bit | 10bit |
|---|---|---|---|---|---|---|---|---|---|
| 0 | 0 | 1 | 1 | 0 | 0 | 0 | 0 | 0 | 1 |

193

(ii) TURN-ON WIDTH OF CONTROL SIGNAL DS1 (BEFORE ERROR PROPAGATION)

| 1bit | 2bit | 3bit | 4bit | 5bit | 6bit |
|---|---|---|---|---|---|
| 0 | 0 | 0 | 1 | 0 | 0 |

12

(iii) REMAINDER VALUE

| 7bit | 8bit | 9bit | 10bit |
|---|---|---|---|
| 0 | 0 | 0 | 1 |

1

(iv) CARRY-OVER VALUE OF PREVIOUS CALCULATION

| 7bit | 8bit | 9bit | 10bit |
|---|---|---|---|
| 1 | 1 | 1 | 1 |

15

(v) SUMMATION VALUE OF CARRY-OVER VALUE OF PREVIOUS CALCULATION AND REMAINDER VALUE

| 6bit | 7bit | 8bit | 9bit | 10bit |
|---|---|---|---|---|
| 1 | 0 | 0 | 0 | 0 |

16

(vi) ERROR PROPAGATION VALUE

| 6bit | 7bit | 8bit | 9bit | 10bit |
|---|---|---|---|---|
| 1 | | | | |

1

(vii) CARRY-OVER VALUE

| 7bit | 8bit | 9bit | 10bit |
|---|---|---|---|
| 0 | 0 | 0 | 0 |

0

(viii) TURN-ON WIDTH OF CONTROL SIGNAL DS1 (AFTER ERROR PROPAGATION)

| 1bit | 2bit | 3bit | 4bit | 5bit | 6bit |
|---|---|---|---|---|---|
| 0 | 0 | 1 | 1 | 0 | 1 |

13

POWER SUPPLY APPARATUS AND IMAGE FORMING APPARATUS

BACKGROUND OF THE INVENTION

Field of the Invention

The present invention relates to a power supply apparatus and an image forming apparatus, and particularly to control of a switching power supply.

Description of the Related Art

If a digital control unit such as a central processing unit (CPU) or an application specific integrated circuit (ASIC) operating with a clock is used for a control unit in a switching power supply configured to convert an alternating-current (AC) voltage of a commercial power supply or the like into a direct current (DC) voltage, control may become discrete depending on the resolution of a pulse width modulation (PWM) output for controlling a switching element. Therefore, Japanese Patent Application Laid-Open No. 2008-299292 discusses a control method for increasing the resolution of a PWM output by combining respective PWM outputs in a plurality of switching cycles (hereinafter referred to as error diffusion control).

However, if the switching power supply has a plurality of operation states (also referred to as operation modes), when the same error diffusion control method is used in the plurality of operation states, the accuracy, efficiency, and responsivity of an output voltage of the switching power supply may be unable to be satisfied.

SUMMARY OF THE INVENTION

According to an aspect of the present invention, there is provided a power supply apparatus in which the accuracy, efficiency, and responsivity of an output voltage of a switching power supply are improved regardless of an operation state of the switching power supply.

Another aspect of the present invention is a power supply apparatus having operation states, including a transformer including a primary winding and a secondary winding, at least one switching element provided on a primary side of the transformer, the at least one switching element configured to perform a switching operation to convert an input voltage in which an alternating-current voltage smoothed and rectified to output an output voltage from a secondary side of the transformer, and a control unit configured to determine a turn-on time of a pulse signal for controlling the switching element for each of first cycles, and perform a predetermined control in which a change value of the turn-on time of the pulse signal for each of second cycles each including the first cycles becomes smaller than a change value of the turn-on time of the pulse signal for each of the first cycles, wherein the control unit changes each of the second cycle depending on each of the operation states.

A further aspect of the present invention is an image forming apparatus including an image forming unit configured to form an image on a recording material, and a power supply apparatus configured to supply power to the image forming unit, wherein the power supply apparatus including a transformer including a primary winding and a secondary winding, at least one switching element provided on a primary side of the transformer, the at least one switching element configured to perform a switching operation to convert an input voltage in which an alternating-current voltage smoothed and rectified to output an output voltage from a secondary side of the transformer, and a control unit configured to determine a turn-on time of a pulse signal for controlling the switching element for each of first cycles, and perform a predetermined control in which a change value of the turn-on time of the pulse signal for each of second cycles each including the first cycles becomes smaller than a change value of the turn-on time of the pulse signal for each of the first cycles, wherein the control unit changes each of the second cycle depending on each of the operation states.

Further features of the present invention will become apparent from the following description of exemplary embodiments with reference to the attached drawings.

BRIEF DESCRIPTION OF THE DRAWINGS

FIG. 2 depicts error diffusion control according to the first embodiment.

FIG. 8 is a diagram for describing error diffusion control according to the second embodiment.

DESCRIPTION OF THE EMBODIMENTS

Preferred embodiments of the present invention will now be described in detail in accordance with the accompanying drawings.

A mode for carrying out the present invention will be specifically described with reference to the drawings according to embodiments.

[Configuration of Power Supply Apparatus]

Figure 1A:
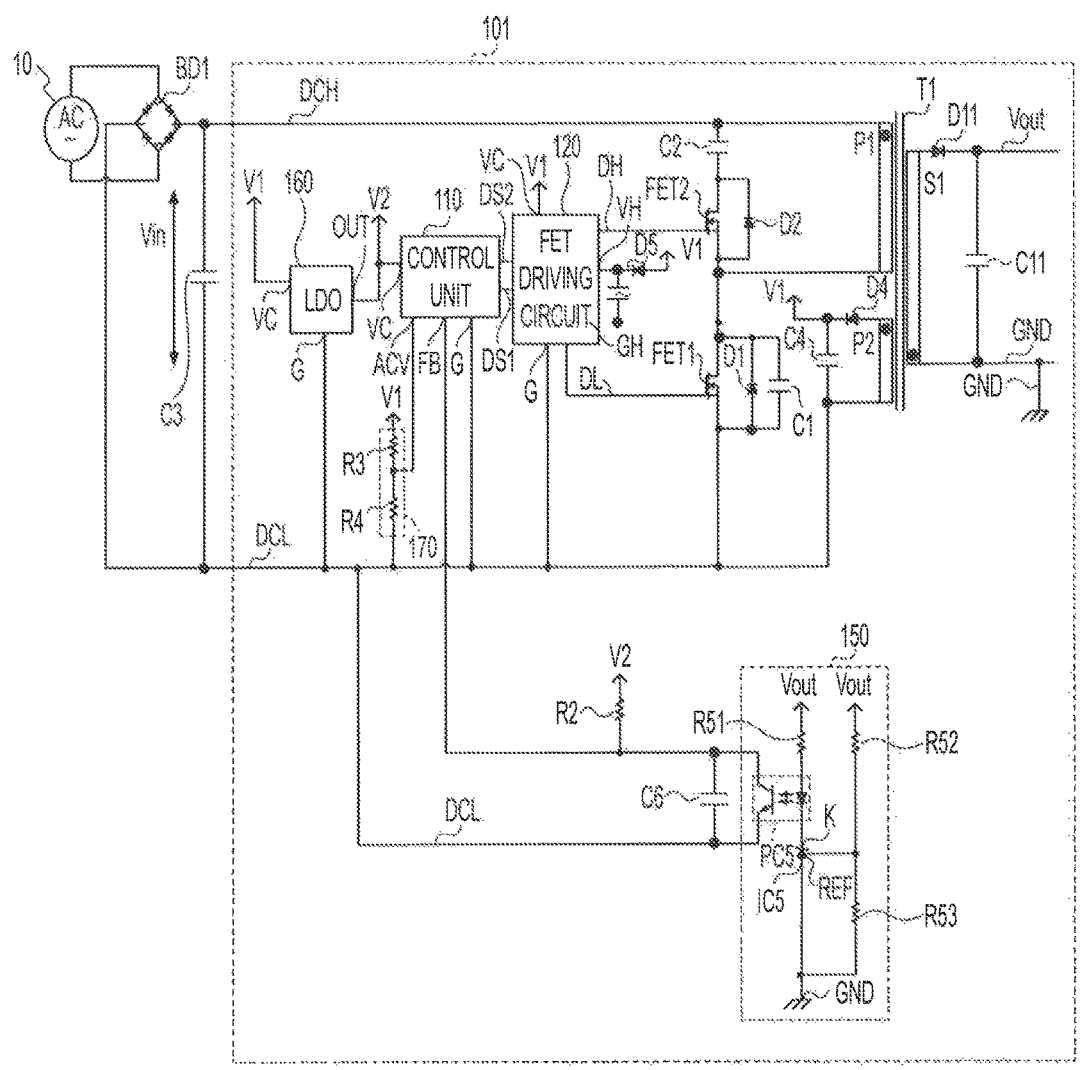
FIG. 1A is a schematic view of a power supply circuit according to a first embodiment.

FIG. 1A is a schematic view of a switching power supply 101 according to a first embodiment. An AC power supply 10 such as a commercial power supply outputs an AC voltage, and an input voltage Vin rectified by a bridge diode BD1 and a capacitor C3 each used as a full-wave rectifying device is input to the switching power supply 101. A lower-side potential and a higher-side potential of the capacitor C3 are respectively DCL and DCH. The switching power supply 101 is an insulating-type converter using a flyback output including an active clamp circuit configured to output an output voltage Vout from the input voltage Vin to an insulated secondary side. The output voltage Vout is a constant voltage of 5 volts, for example, as an example in the first embodiment. The switching power supply 101 includes an insulating-type transformer T1 including a primary winding P1 and an auxiliary winding P2 on a primary side, and a secondary winding S1 on a secondary side. Supply of power from the primary winding P1 to the secondary winding S1 in the transformer T1 is performed by a switching operation for alternately turning on and off a field effect transistor 1 (hereinafter referred to as an FET 1) and a field effect transistor 2 (hereinafter referred to as an FET 2) with a dead time provided therebetween. The auxiliary winding P2 in the transformer T1 is used to smooth and rectify a forward voltage as the input voltage Vin applied to the primary winding P1 using a diode D4 and a capacitor C4 and supply a power supply voltage V1. A switching power supply system used in the first embodiment may be other than a power supply system described in the switching power supply 101, and is not particularly limited.

The field effect transistor (FET) 1 is connected in series with the primary winding P1 in the transformer T1 on the primary side of the switching power supply 101. The FET 2 and a capacitor C2 for voltage clamping are connected in series, and a circuit in which the FET 2 and the capacitor C2 are connected in series is connected in parallel with the primary winding P1 in the transformer T1. The switching power supply 101 includes a control unit 110 and an FET driving circuit 120 as a control device for the FET 1 and the FET 2. A capacitor C1 for voltage resonance connected in parallel with the FET 1 is provided to reduce a loss when the FET 1 and the FET 2 are turned off. A diode D1 is a body diode of the FET 1. Similarly, a diode D2 is a body diode of the FET 2.

The switching power supply 101 includes on the secondary side a diode D11 and a capacitor C11 as a smoothing and rectifying device on the secondary side of a flyback voltage occurring in the secondary winding S1 in the transformer T1. The switching power supply 101 includes on the secondary side a feedback unit 150 as a feedback device used to feed back to the primary side the output voltage Vout output to the secondary side.

Figure 1B:
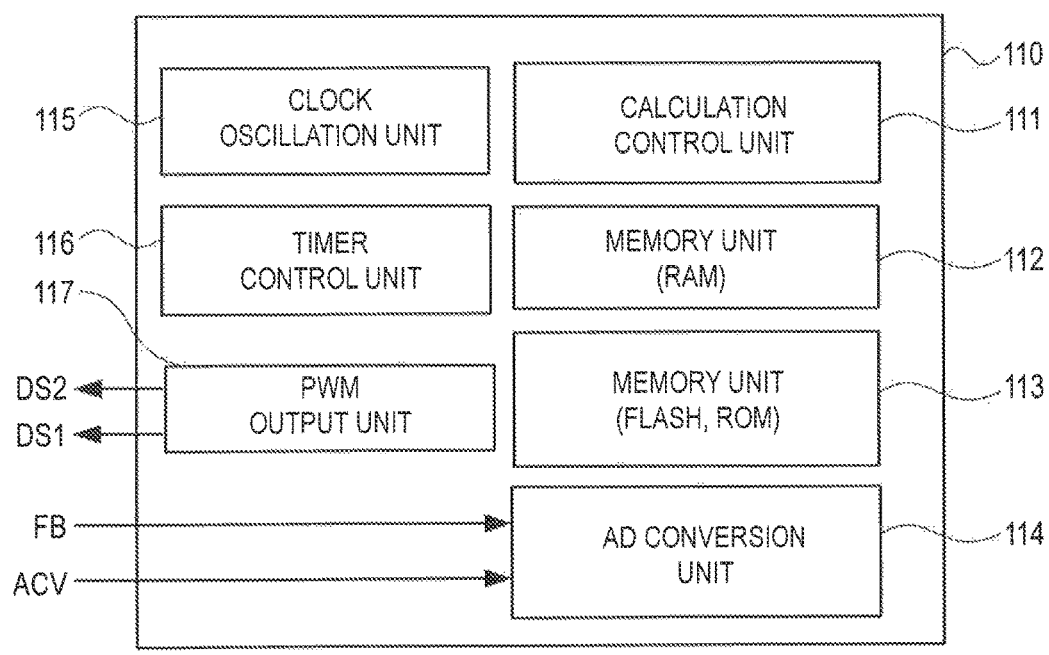
FIG. 1B is a schematic view of a control unit according to the first embodiment.

The control unit 110 is a digital control circuit (a CPU, an ASIC, etc.) operating in response to a clock signal generated by a clock oscillation unit 115, illustrated in FIG. 1B. When a digital control unit such as a CPU is used for the control unit 110 in the switching power supply 101, complicated waveform control of control signals DS1 and DS2 can be implemented by a low-cost integrated circuit. The control unit 110 outputs pulse signals to the control signal DS1 and the control signal DS2, respectively, based on voltage signals input to an FB terminal and an ACV terminal of the control unit 110. The control signal DS1 is a driving signal for the FET 1, and the control signal DS2 is a driving signal for the FET 2. The control unit 110 controls the FET 1 and the FET 2 via the FET driving circuit 120. A power supply voltage V2 generated by an LDO (low drop out) 160, described below, is supplied between a VC terminal and a G terminal of the control unit 110.

The FET driving circuit 120 generates a gate driving signal DL of the FET 1 in response to the control signal DS1, and generates a gate driving signal DH of the FET 2 in response to the control signal DS2. The power supply voltage V1 is supplied between a VC terminal and a G terminal of the FET driving circuit 120. To drive the FET 2, the power supply voltage V1 is supplied between a VH terminal and a GH terminal of the FET driving circuit 120 by a charge pump circuit including a capacitor C5 and a diode D5. The FET driving circuit 120 brings the gate driving signal DL of the FET 1 into a high level when the control signal DS1 enters a high level, and the FET 1 enters an on state. Similarly, the FET driving circuit 120 brings the gate driving signal DH of the FET 2 into a high level when the control signal DS2 enters a high level, and the FET 2 enters an on state.

The feedback unit 150 is used to control the output voltage Vout to a predetermined constant voltage. A voltage value of the output voltage Vout is set by a reference voltage of a reference terminal REF of a shunt regulator IC5 and voltage-dividing resistors R52 and R53. When the output voltage Vout becomes higher than a predetermined voltage (here, 5 volts), a current flows from a cathode terminal K of the shunt regulator IC5, and a secondary side diode in a photo-coupler PC5 is rendered conductive via a pull-up resistor R51. When a primary side transistor in the photo-coupler PC5 then operates, a charge is discharged from a capacitor C6, and a voltage at the FB terminal of the control unit 110 decreases. The voltage at the FB terminal of the control unit 110 is set as an FB terminal voltage. On the other hand, when the output voltage Vout becomes lower than the predetermined voltage (here, 5 volts), a charging current flows through the capacitor C6 from the power supply voltage V2 via a resistor R2. Accordingly, the FB terminal voltage of the control unit 110 increases. The control unit 110 performs feedback control to control the output voltage Vout to a predetermined constant voltage by detecting the FB terminal voltage (corresponding to a feedback voltage). Thus, the control unit 110 can perform feedback control of the output voltage Vout by monitoring the FB terminal voltage.

The LDO 160 is a three-terminal regulator. The power supply voltage V2 is output to an OUT terminal of the LDO 160 from the power supply voltage V1 input between a VC terminal and a G terminal of the LDO 160. The LDO 160 outputs an optimum low voltage (e.g., 3.3 volts) for an operation of the control unit 110 as the power supply voltage V2.

The switching power supply 101 includes, as a detection device for the input voltage Vin, an input voltage detection unit 170 configured to divide the power supply voltage V1 obtained by smoothing and rectifying the auxiliary winding P2 by the resistors R3 and R4 and input the divided power supply voltage V1 to the ACV terminal of the control unit 110. Therefore, the switching power supply 101 detects the input voltage Vin. The control unit 110 corrects a turn-on width of the control signal DS1 based on a voltage value of the input voltage Vin input to the ACV terminal. Details will be described using Table 1 and the like. Respective turn-on widths of the control signals DS1 and DS2 are respectively time periods during which the FET 1 and the FET 2 are turned on, and mean turn-on times.

The switching power supply 101 uses the FB terminal voltage as a device configured to detect a load of the output voltage Vout. When a load current of the output voltage Vout increases, the FB terminal voltage increases. Therefore, the control unit 110 can grasp a state of the load using the FB terminal voltage, and performs appropriate control depending on the state of the load. To more accurately determine the state of the load, a path configured to supply power to a load on the FET 1 or the switching power supply 101 may be provided with a current detection device (not illustrated). A device configured to determine a light load state in the first embodiment will be described as using the FB terminal voltage of the control unit 110.

[Configuration of Control Unit]

FIG. 1B is a schematic view of the control unit 110. The control unit 110 is, for example, a microcomputer formed by a one-chip integrated circuit including the clock oscillation unit 115, a timer control unit 116, a PWM output unit 117, a calculation control unit 111, a storage unit 112, a storage unit 113, and an AD (analog-to-digital) conversion unit 114. The storage unit 112 is a volatile memory such as a random access memory (RAM), and the storage unit 113 is a nonvolatile memory such as a FLASH memory or a read-only memory (ROM).

The calculation control unit 111 is a control unit operating in response to the clock signal of the clock oscillation unit 115 and configured to perform sequential calculations after reading an instruction and data stored in the storage unit 113 in the storage unit 112. The calculation control unit 111 performs control of the FET 1 and the FET 2 by controlling respective setting values of two control signals DS1 and DS2 of the PWM output unit 117 based on the FB terminal voltage detected by the AD conversion unit 114 and a voltage at the ACV terminal (hereinafter referred to as an ACV terminal voltage). Examples of the respective setting values of the control signals DS1 and DS2 include a control start timing, a cycle of the PWM signal, and an on-duty.

The AD conversion unit 114 is an 8-bit AD converter, and the timer control unit 116 is a timer used for intermittent control, which will be described in FIG. 4. The PWM output unit 117 operates based on the clock oscillation unit 115. Accordingly, control of a pulse width of the output PWM signal becomes discrete. In the first embodiment, a case where the resolution of the PWM output unit 117 is 0.125 µsec, for example, will be described.

[Error Diffusion Control]

Referring to FIG. 2, (i) to (x) illustrate a method of calculating a turn-on width of a pulse signal in the control signal DS1 using error diffusion control. The error diffusion control is a control method in which a plurality of pulse signals is combined to control respective output levels of the control signals DS1 and DS2 with higher accuracy than the resolution of 0.125 µsec of the PWM output unit 117. The control unit 110 repeatedly performs calculations in (i) to (x) for each cycle of feedback control to update respective setting values of the control signals DS1 and DS2.

In FIG. 2, (i) illustrates an AD conversion value of an FB terminal voltage. When the FB terminal voltage is 0.96 volts, the AD conversion value is 74 in decimal notation. In FIG. 2, a value (e.g., 74) in decimal notation and a value (e.g., 01001010) in binary notation of the AD conversion value are illustrated. In binary notation, a least significant bit to a most significant bit are respectively 8 bit to 1 bit.

In FIG. 2, (ii) illustrates a correction value of the turn-on width of the pulse signal in the control signal DS1 based on an ACV terminal voltage (in other words, an input voltage Vin). The correction value based on the ACV terminal voltage is set such that the larger a voltage value of the input voltage Vin becomes, the larger the correction value becomes. Table 1 illustrates an example of a conversion table between the voltage value of the input voltage Vin and the correction value detected by the ACV terminal voltage. Table 1 illustrates a correction value of a turn-on width of the control signal DS1 in an operation state (first voltage state) where a low voltage (5 volts) is output as an output voltage Vout, like in the switching power supply 101 according to the first embodiment. A voltage effective value (Vrms) of the AC power supply 10 is given in a left column, and the correction value based on the ACV terminal voltage is given in a right column. For example, when the voltage effective value of the AC power supply 10 is approximately 113.3 volts, the correction value becomes 29 in decimal notation (00011101 in binary notation) from Table 1.

TABLE 1

CORRECTION VALUE OF TURN-ON WIDTH OF CONTROL SIGNAL DS1 IN FIRST VOLTAGE MODE IN WHICH LOW VOLTAGE (5 VOLTS) IS OUTPUT

| VOLTAGE EFFECTIVE VALUE OF AC POWER SUPPLY 10 (Vrms) | CORRECTION VALUE BASED ON ACV TERMINAL VOLTAGE |
|---|---|
| 126.7 | 35 |
| 123.3 | 34 |
| 120.0 | 32 |
| 116.7 | 30 |
| 113.3 | 29 |
| 110.0 | 27 |
| 106.7 | 25 |
| 103.3 | 23 |
| 100.0 | 20 |

In FIG. 2, (iii) illustrates a value obtained by subtracting the correction value based on the ACV terminal voltage from the AD conversion value of the FB terminal voltage. The value becomes a control value of the turn-on width of the control signal DS1. The control value of the turn-on width of the control signal DS1 is expressed by the following equation (1). In an example illustrated in FIG. 2, the control value of the turn-on width of the control signal DS1 becomes 45 (=74−29) (00101101 in binary notation), and the calculations for the error diffusion control are performed using the control value.

Control value of turn-on width of control signal
DS1=AD conversion value of FB terminal voltage−Correction value of ACV terminal voltage [Equation (1)]

In FIG. 2, (iv) illustrates a value obtained by extracting upper six bits in the control value of the turn-on width of the control signal DS1 and corresponding to a turn-on width of the control signal DS1 before the error diffusion control is performed. The upper six bits in the eight bits illustrated in FIG. 2(iii) are extracted, and are converted into a decimal digit with 6 bit set as the least significant bit. In other words, the control value of the turn-on width of the control signal DS1 is shifted right by two bits. A value (001011) of the upper six bits becomes 11 in decimal notation. In FIG. 2, (v) illustrates a remainder value rounded down in the calculation (iv), i.e., a value (01) of 7 bit (0) and 8 bit (1) that are lower two bits. The value of the two bits is a value rounded down because the resolution of the PWM output unit 117 is low, and is a value used for the error diffusion control. The remainder value is 1 in decimal notation (01 in binary notation).

In FIG. 2, (vi) illustrates a carry-over value described below in FIG. 2, (ix) calculated in a cycle of previous feedback control. For example, the carry-over value is set to 3 in decimal notation (11 in binary notation). A carry-over value in the previous calculation is also lower two bits (7 bit and 8 bit), and is an accumulated value of remainder values respectively rounded down at the time of calculations preceding the previous calculation. FIG. 2, (vii) illustrates a summation value obtained by adding the remainder value obtained in FIG. 2, (v) and the carry-over value in the calculation for the previous feedback control described in FIG. 2, (vi). In this example, the summation value becomes 4 in decimal notation (100 in binary notation). The upper bit (6 bit) illustrated in FIG. 2, (viii) among the values of the three bits is an error diffusion value (1) to be reflected on control of the turn-on width of the control signal DS1. The lower two bits (7 bit and 8 bit) illustrated in FIG. 2, (ix) are a carry-over value (0) used in a cycle of subsequent feedback control. That is, the carry-over value illustrated in FIG. 2, (ix) becomes a carry-over value in the previous calculation illustrated in FIG. 2(vi) in the subsequent calculation.

FIG. 2, (x) illustrates a value obtained by adding the error diffusion value calculated in FIG. 2, (viii) to the turn-on width (11 in decimal notation) of the control signal DS1 calculated in FIG. 2, (iv) and corresponding to a turn-on width of the control signal DS1 after the error diffusion control. For example, the control value of the turn-on width of the control signal DS1 before the error diffusion control is 11 in decimal notation, and the error diffusion value is 1 in decimal notation. Accordingly, the control value of the turn-on width of the control signal DS1 after the error diffusion control is 12 (=11+1) in decimal notation (001100 in binary notation). Therefore, the turn-on width of the control signal DS1 is found from the following equation (2).

Turn-on width of control signal DS1 (after error diffusion control)=0.125 μsec (resolution)×Control value of turn-on width (after error diffusion control) [Equation (2)]

In the error diffusion control, the remainder values rounded down are accumulated, because the resolution of the PWM output unit 117 is low, by the calculations illustrated in FIG. 2, (v) to (ix). Every time a summation value of the carry-over value and the remainder value in the previous calculation reaches four in FIG. 2, vii), control in FIG. 2, (x) to be reflected on the turn-on width of the control signal DS1 is performed. Thus, the resolution of the control signal DS1 of the PWM output unit 117 is increased in a pseudo manner. The control unit 110 repeatedly performs the calculations illustrated in FIG. 2, (i) to (x) for each cycle of feedback control, to perform the error diffusion control.

[Error Diffusion Control]

The control signals DS1 and DS2 in a case where the error diffusion control described in FIG. 2 has been performed will be described with reference to FIG. 3A and FIG. 3B. The switching power supply 101 can operate in a plurality of operation states (modes), e.g., a heavy load mode as a first state and a light load mode as a second state, described below.

(Case of Heavy Load Mode)

Figure 3A:
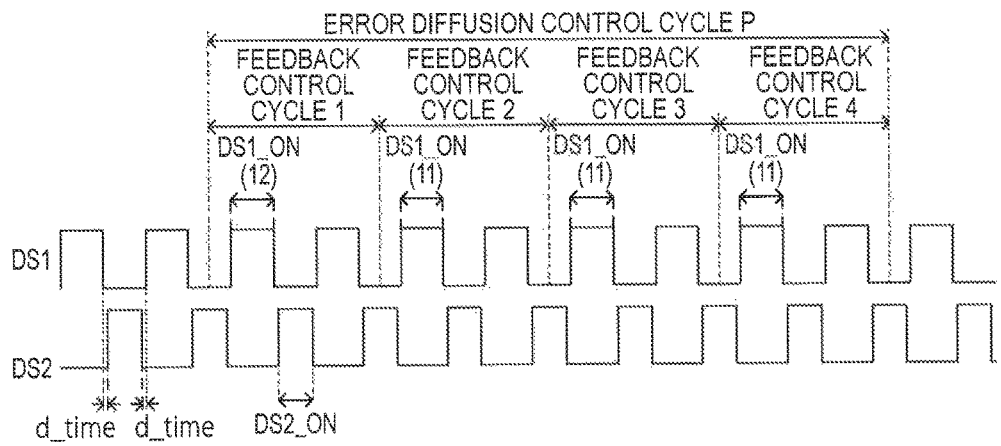
FIG. 3A illustrates respective waveforms in a case where the control signals are continuously controlled.

FIG. 3A illustrates respective waveforms in a case where the control signals DS1 and DS2 are continuously controlled (hereinafter also referred to as a continuous operation mode (also a first state)) when a load on the secondary side of the switching power supply 101 is in a heavy load state (hereinafter also referred to as a heavy load mode). The upper waveform is a waveform of the control signal DS1, and the lower waveform is a waveform of the control signal DS2. A dead time period d_time, in which the control signals DS1 and DS2 simultaneously enter an off state, and a turn-on width DS2_ON of the control signal DS2 are respectively predetermined fixed values.

In FIG. 3A, a case where feedback control is performed every time the control unit 110 outputs two pulses of each of the control signals DS1 and DS2 to update a pulse width of the control signal DS1 will be described. A cycle in which the feedback control is performed is hereinafter referred to as a feedback control cycle as a first cycle. Further, a cycle in which the error diffusion control is performed is referred to as an error diffusion control cycle P as a second cycle. If the calculation speed of the control unit 110 is sufficiently fast, feedback control may be performed every time one pulse is output. If the calculation speed of the control unit 110 is slow, the feedback control may be performed every time more pulses than two pulses are output. That is, how many pulses of the control signal DS1 compose the feedback control cycle is determined depending on the calculation speed of the control unit 110. A pulse waveform of each of the control signals DS1 and DS2 in the FB terminal voltage and the ACV terminal voltage described in FIG. 2 will be described.

In a feedback control cycle 1, the pulse waveform becomes a waveform representing a result of the calculations described in FIG. 2, and a control value of a turn-on width (DS1_ON) of the control signal DS1 after the error diffusion control is 12 (FIG. 2(x)). In the feedback control cycle 1, an error diffusion value is 1 (FIG. 2(viii)), and a carry-over value is 0 (FIG. 2(ix)). The control unit 110 calculates a turn-on width of the control signal DS1 used in a feedback control cycle 2 during a period of the feedback control cycle 1. When calculations for the error diffusion control are also similarly performed in the feedback control cycle 2, a control value of the turn-on width of the control signal DS1 after the error diffusion control is 11. In the feedback control cycle 2, an error diffusion value is 0, and a carry-over value is 1. The control unit 110 calculates a turn-on width of the control signal DS1 used in a feedback control cycle 3 during a period of the feedback control cycle 2.

When calculations for the error diffusion control are also similarly performed in the feedback control cycle 3, a control value of the turn-on width of the control signal DS1 after the error diffusion control is 11. In the feedback control cycle 3, an error diffusion value is 0, and a carry-over value is 2. The control unit 110 calculates a turn-on width of the control signal DS1 used in a feedback control cycle 4 during a period of the feedback control cycle 3. When calculations for the error diffusion control are also similarly performed in the feedback control cycle 4, a control value of the turn-on width of the control signal DS1 after the error diffusion control is 11. In the feedback control cycle 4, an error diffusion value is 0, and a carry-over value is 3. In a feedback control cycle 5 (not illustrated), a control value of the turn-on width of the control signal DS1 after the error diffusion control becomes 12.

When the calculations for the error diffusion control described in FIG. 2 are thus repeatedly performed in the feedback control cycles 1 to 4, the respective turn-on widths of the control signal DS1 can be controlled in combination in an error diffusion control cycle P. In the heavy load mode, the error diffusion control cycle P illustrated in FIG. 3A becomes four times the feedback control cycle. The error diffusion control cycle P is determined depending on how many bits compose a carry-over value. In this case, a value of an average of the pulse widths (turn-on widths) of the control signal DS1 (hereinafter referred to as an average pulse width) becomes 11.25 (=(12+11+11+11)/4).

Similarly, the calculations described in FIG. 2 will be described for a case where an AD conversion value of the FB terminal voltage is 75 to 77. A correction value based on the ACV terminal voltage is 29 in decimal notation. If the AD conversion value of the FB terminal voltage is 75, a value of an average pulse width of the control signal DS1 is 11.5. If the AD conversion value of the FB terminal voltage is 76, a value of an average pulse width of the control signal DS1 is 11.75. If the AD conversion value of the FB terminal voltage is 77, a value of an average pulse width of the control signal DS1 is 12. When the error diffusion control is thus performed, four pulse widths of the control signal DS1 can be controlled in combination, and the resolution (0.125 μsec) of the PWM output unit 117 becomes controllable every 0.25 stages. Accordingly, the resolution of the average pulse width of the control signal DS1 can be increased to four times (31.25 nsec (=0.125/4)). Thus, in the error diffusion control as predetermined control, a change width (also referred to as a change value) between average values of turn-on widths of pulse signals for second cycles each including a plurality of first cycles can be made smaller than a change width between turn-on widths of pulse signals for the first cycles. The change width between the average values of the turn-on widths of the pulse signals for the second cycles corresponds to a change width 0.25 between average pulse widths 11.25 and 11.50, for example. The change width between the turn-on widths of the pulse signals for the first cycles corresponds to a change width 1 between control values 11 and 12, for example.

(Case of Light Load Mode)

Figure 3B:
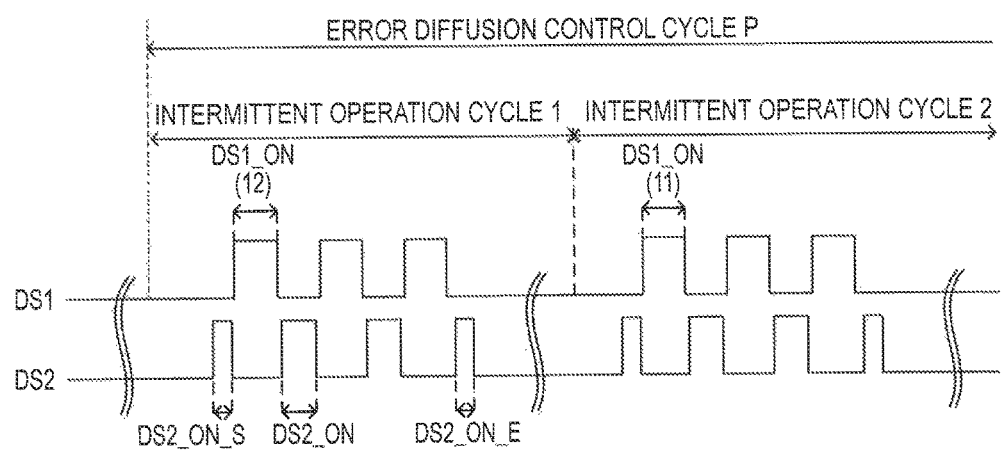
FIG. 3B illustrates respective waveforms in a case where the control signals are intermittently controlled.
Figure 3C:
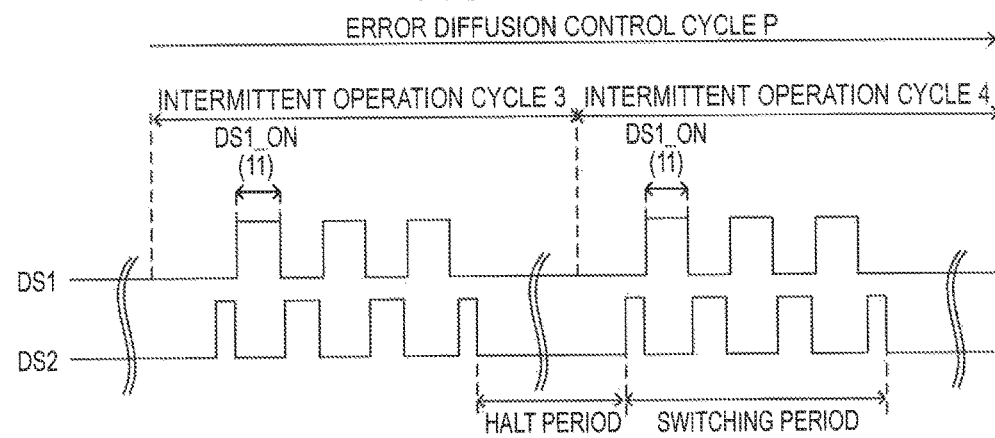
FIG. 3C illustrates respective waveforms in a case where the control signals are intermittently controlled.

FIG. 3B illustrates respective waveforms in a case where the control signals DS1 and DS2 are intermittently controlled (an intermittent operation mode (also a second state)) when a load on the secondary side of the switching power supply 101 is in a light load state (hereinafter also referred to as a light load mode), and is a similar graph to FIG. 3A. The control unit 110 performs intermittent control to reduce the respective numbers of times of switching of the FET 1 and the FET 2 and improve the efficiency of the switching power supply 101 when the switching power supply 101 is in the light load state. The intermittent control is control to repeat a switching period and a halt period. The switching period in the intermittent control is a period during which the FET 1 and FET 2 are turned on and off, and is a period from a leading edge of a first pulse signal to a trailing edge of a last pulse signal in the control signal DS2, as illustrated in FIG. 3B. The halt period in the intermittent control is a period during which the FET 1 and the FET 2 are not turned on and off (are maintained in an off-state). The halt period is a period from a trailing edge of the last pulse signal in the control signal DS2 in the switching period to a leading edge of a first pulse signal in the control signal DS2 in a subsequent switching period. A cycle that is a sum of the switching period and the halt period is a cycle of an intermittent operation as a first cycle. A turn-on width DS2_ON_S of the first pulse signal in the control signal DS2 in the switching period in the intermittent control and a turn-on width DS2_ON_E of the last pulse signal in the control signal DS2 in the switching period in the intermittent control are respectively predetermined fixed values.

In a cycle 1 of the intermittent operation, when a control value of a turn-on width of the control signal DS1 before the error diffusion control before the intermittent control is 74 and a carry-over value in the previous calculation is 3, a control value of a turn-on width of the control signal DS1 after the error diffusion control is 12, like in the description illustrated in FIG. 2 (FIG. 2(i) and FIG. 2(x)). An error diffusion value is 1, and a carry-over value is 0, like in FIG. 2 (FIG. 2(viii) and FIG. 2(ix)). During a period of the cycle 1 of the intermittent operation, a turn-on width of the control signal DS1 used in a cycle 2 of the intermittent operation is calculated. That is, the control unit 110 updates a pulse width of the control signal DS1 for each cycle of the intermittent operation.

In the cycle 2 of the intermittent operation, when calculations for the error diffusion control are similarly performed, a control value of a turn-on width of the control signal DS1 after the error diffusion control is also 11. An error diffusion value is 0, and a carry-over value is 1. During a period of the cycle 2 of the intermittent operation, a turn-on width of the control signal DS1 used in a cycle 3 of the intermittent operation is calculated. In the cycle 3 of the intermittent operation, when calculations for the error diffusion control are similarly performed, a control value of a turn-on width of the control signal DS1 after the error diffusion control is also 11. An error diffusion value is 0, and a carry-over value is 2. During a period of the cycle 3 of the intermittent operation, a turn-on width of the control signal DS1 used in a cycle 4 of the intermittent operation is calculated. In the cycle 4 of the intermittent operation, when calculations for the error diffusion control are similarly performed, a control value of a turn-on width of the control signal DS1 after the error diffusion control is also 11. An error diffusion value is 0, and a carry-over value is 3. When the control calculations described in FIG. 2 are thus repeatedly performed in the cycles 1 to 4 of the intermittent operation, the respective turn-on widths of the control signal DS1 in the four cycles of the intermittent operation can be controlled in combination, and a control value of an average pulse width of the control signal DS1 becomes 11.25. In the light load mode, an error diffusion control cycle P illustrated in FIG. 3B becomes four times the cycle of the intermittent operation.

If the error diffusion control cycle P and the feedback control cycle are too long, respective responsivities to variations in the FB terminal voltage and the ACV terminal voltage decrease. Therefore, in the heavy load mode of the switching power supply 101 illustrated in FIG. 3A, the error diffusion control cycle P and the feedback control cycle are set as short as possible to correspond to a large load variation of the output voltage Vout and satisfy a voltage accuracy required for the output voltage Vout. In FIG. 3A, the feedback control cycle is two pulses of the control signal DS1.

On the other hand, in the light load state of the switching power supply 101 illustrated in FIG. 3B, a load variation of the output voltage Vout is small. Accordingly, even if the cycle of the intermittent operation and the error diffusion control cycle P are lengthened, a voltage accuracy required for the output voltage Vout can be satisfied. In the light load state of the switching power supply 101, a ratio of power consumed by the control unit 110 becomes relatively larger than the ratio in the heavy load state. In the light load state of the switching power supply 101, a method of performing a calculation once for each cycle of the intermittent operation to reduce a calculation frequency of the error diffusion control and reducing a calculation amount of the control unit 110 to reduce power consumption of the switching power supply 101 is effective.

In the light load state of the switching power supply 101, the turn-on width of the control signal DS1 at the time of the intermittent control needs to be controlled with high accuracy. If the error diffusion control has not been performed, for example, when the pulse width of the control signal DS1 of the FET 1 becomes smaller than an optimum value, the number of times of switching of the FET 1 increases, and the efficiency of the switching power supply 101 decreases. When the pulse width of the control signal DS1 of the FET 1 becomes larger than an optimum value, energy supplied to the transformer T1 by performing a switching operation once increases so that a high-frequency sound generated in the transformer T1 may increase. Therefore, a method of performing the error diffusion control described in FIG. 2, FIG. 3A, and FIG. 3B is also effective in the light load state of the switching power supply 101.

[Control of Switching Power Supply]

Figure 4:
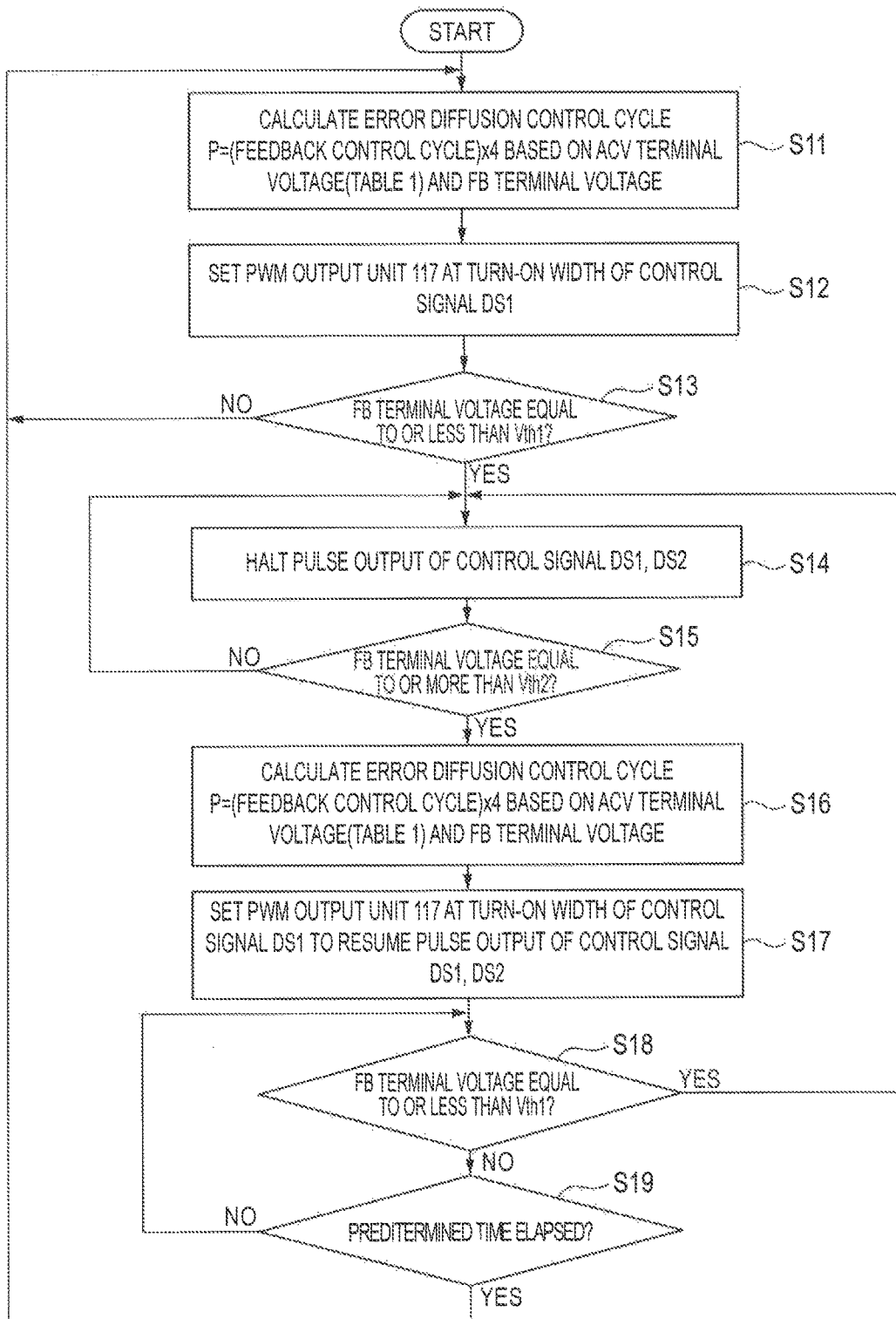
FIG. 4 is a flowchart illustrating control of a switching power supply according to the first embodiment.

FIG. 4 is a flowchart illustrating control of the switching power supply 101 by the control unit 110. When the AC power supply 10 is connected to the switching power supply 101, the control unit 110 starts to control the control signals DS1 and DS2 in step (hereinafter abbreviated as S) 11 and subsequent steps. In S11, the control unit 110 performs the calculations for the error diffusion control described in FIG. 2 based on an ACV terminal voltage input from the input voltage detection unit 170 and an FB terminal voltage input from the feedback unit 150. At this time, an error diffusion control cycle P is a feedback cycle multiplied by four. In S12, the control unit 100 reflects a control value (e.g., 12) of a turn-on width of the control signal DS1 after the error diffusion control found by the calculation in S11 on a setting value of the PWM output unit 117. In S13, the control unit 100 determines whether the switching power supply 101 is in a light load state based on the FB terminal voltage. For example, the control unit 100 determines whether the FB terminal voltage is a first threshold value Vth1 or less (e.g., 71 or less when represented by an AD conversion value) for determining whether the FB terminal voltage is in the light load state. If the control unit 100 determines in S13 that the FB terminal voltage is the first threshold value Vth1 or less, the control unit 100 determines that the switching power supply 101 is in the light load state, and the processing proceeds to S14, to perform the intermittent control. If the control unit 100 determines in S13 that the FB terminal voltage is larger than the first threshold value Vth1, the control unit 100 determines that the switching power supply 101 is in a heavy load state, and the processing returns to S11, to continue a state of continuous control. When the control in S11 to S13 is repeated, the control unit 100 can output a waveform in the continuous operation mode described in FIG. 3A.

In S14, the control unit 110 stops outputting respective pulse signals in the control signals DS1 and DS2. In S15, the control unit 110 determines whether the FB terminal voltage is a second threshold value Vth2 or more (e.g., 74 or more when represented by an AD conversion value) for determining whether the FB terminal voltage is in the heavy load state. The second threshold value Vth2 is larger than the first threshold value Vth1 (Vth2>Vth1). If the control unit 100 determines in S15 that the FB terminal voltage is less than the second threshold value Vth2, the processing returns to S14. Thus, the control unit 100 stops outputting the respective pulse signals in the control signals DS1 and DS2 in a period elapsed until the FB terminal voltage becomes the second threshold value Vth2 or more. That is, the period is a halt period at the time of the intermittent operation illustrated in FIG. 3B.

If the control unit 100 determines in S15 that the FB terminal voltage is the second threshold value Vth2 or more, the processing proceeds to S16. In S16, the control unit 100 performs the calculation for the error diffusion control described in FIG. 2 based on the ACV terminal voltage and the FB terminal voltage. At this time, the error diffusion control cycle P is an intermittent operation cycle multiplied by four. The calculation in S16 is performed after the processing in S15. Accordingly, the FB terminal voltage becomes the second threshold value Vth2 (74 when represented by an AD conversion value). In S17, the control unit 100 reflects a turn-on width of the control signal DS1 after the error diffusion control calculated in S16 on the setting value of the PWM output unit 117. The control unit 100 starts to output the respective pulse signals in the control signals DS1 and DS2 again while starting to measure a time by the timer control unit 116 to use the time for determination of an elapse of a predetermined time in S19, described below. In S18, the control unit 100 determines whether the switching power supply 101 is in a light load state based on the FB terminal voltage. For example, the control unit 100 determines whether the FB terminal voltage is the first threshold value Vth1 or less (71 or less when represented by an AD conversion value). If the control unit 100 determines in S18 that the FB terminal voltage is the first threshold value Vth1 or less, the control unit 100 determines that the switching power supply 101 is in the light load state, and the processing returns to S14, to continue the intermittent control. A period elapsed until the FB terminal voltage becomes the first threshold value Vth1 or less since the control unit 100 started to output the respective pulse signals in the control signals DS1 and DS2 again in S17 is the switching period at the time of the intermittent operation illustrated in FIG. 3B. If the control unit 100 determines in S18 that the FB terminal voltage is larger than the first threshold value Vth1, the processing proceeds to S19. When the control in S14 to S17 is repeated, the control unit 100 can output the waveform in the intermittent operation mode described in FIG. 3B.

In S19, the control unit 100 determines whether a predetermined time has elapsed based on the time when the timer control unit 116 has started measurement in S17. If the control unit 100 determines in S19 that the predetermined time has not elapsed, the processing returns to S18. If the control unit 100 determines in S19 that the predetermined time has elapsed, the control unit 100 determines that the switching power supply 101 is in the heavy load state, the processing returns to S11, to shift to a continuous operation mode. When a switching period during which the error diffusion control is not performed is continued for a long time without shifting to the continuous operation mode (S11) with the FB terminal voltage maintainable at a larger value than the first threshold value Vth1, the control unit 100 enters a state where feedback control is not performed. Accordingly, the voltage accuracy of the output voltage Vout deteriorates. Therefore, the predetermined time in S19 is set to a time short enough for the output voltage accuracy not to deteriorate.

As described above, in the first embodiment, the error diffusion cycle P is set long in the light load mode and is set short in the heavy load mode. Thus, the efficiency of the output voltage Vout in the light load mode of the switching power supply 101 can be improved while the accuracy and responsivity of the output voltage Vout in the heavy load mode are satisfied. In the switching power supply 101 according to the first embodiment, an active clamp-type power supply including two switching elements (FET 1 and FET 2) has been described. However, the configuration according to the first embodiment is also applicable to a switching power supply including one switching element (FET) (e.g., a flyback power supply or a forward power supply including neither an FET 2 nor a capacitor C2).

As described above, according to the first embodiment, the accuracy, efficiency, and responsivity of the output voltage of the switching power supply can be improved regardless of the operation mode of the switching power supply.

A switching power supply 200 described in a second embodiment differs from the switching power supply 101 described in the first embodiment in that two different voltages (e.g., 5 volts and 24 volts) can be output as an output voltage Vout. For similar control to the control illustrated in the first embodiment, description is not repeated using the same reference numerals.

[Configuration of Power Supply Apparatus]

Figure 5A:
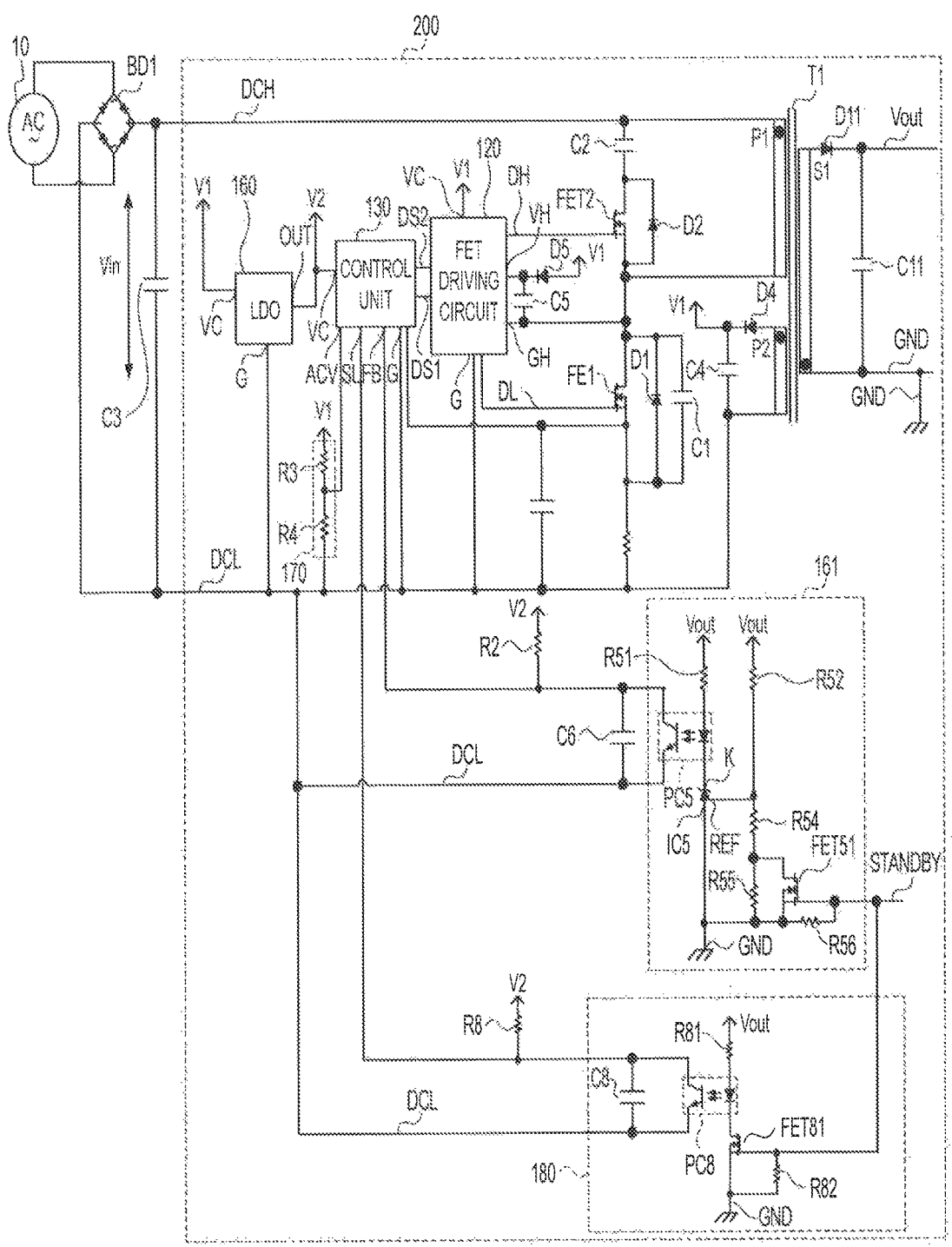
FIG. 5A is a schematic view of a power supply circuit according to a second embodiment.

FIG. 5A is a schematic view of the switching power supply 200 according to the second embodiment. The same components as the components in the first embodiment are assigned the same reference numerals, and hence description is not repeated. A feedback unit 161 is used to control the output voltage Vout to two constant voltages, i.e., a voltage of 5 volts as a first voltage mode and a voltage of 24 volts as a second voltage mode. In the second embodiment, a resistor R55 is connected in series with a resistor R54. A drain terminal of a field effect transistor 51 (hereinafter referred to as an FET 51) is connected to one end of the resistor R55, and a source terminal of the FET 51 is connected to the other end (connected to ground (GND)) of the resistor R55. A STANDBY signal is input from the outside to a gate terminal of the FET 51. A resistor R56 is connected between the gate terminal and the source terminal of the FET 51. In the feedback unit 161, when the STANDBY signal as a signal input from the outside enters a high level, the FET 51 enters an on state so that the resistor R55 is shorted. Therefore, a target voltage to be feedback-controlled increases. Accordingly, the feedback unit 161 is ready to output the voltage of 24 volts as the output voltage Vout. On the other hand, when the STANDBY signal enters a low level, the FET 51 enters an off state so that the resistors R54 and R55 are connected in series. Therefore, a target voltage to be feedback-controlled decreases. Accordingly, the feedback unit 161 is ready to output the voltage of 5 volts as the output voltage Vout.

A switching notification unit 180 as a voltage switching unit is used to notify a control unit 130 of a timing at which a first voltage mode and a second voltage mode are switched based on the STANDBY signal. The switching notification unit 180 includes resistors R81 and R82, a capacitor C8, a photocoupler PC8, and a field effect transistor 81 (hereinafter referred to as an FET 81). An anode terminal of a secondary side diode in the photocoupler PC8 is connected to one end of the resistor R81. A cathode terminal of the secondary side diode in the photocoupler PC8 is connected to a drain terminal of the FET 81. A source terminal of the FET 81 is connected to the ground (GND). The resistor R82 is connected between a gate terminal and the source terminal of the FET 81. The STANDBY signal is input from the outside to the gate terminal of the FET 81. One end of the capacitor C8 is connected to a collector terminal of a primary side transistor in the photocoupler PC8, and the other end of the capacitor C8 and a low-potential side DCL of a capacitor C3 are connected to an emitter terminal of the primary side transistor. A power supply voltage V2 is connected via a resistor R8 and an SL terminal of the control unit 130 is connected to the collector terminal of the primary side transistor in the photocoupler PC8 and the one end of the capacitor C8.

When the STANDBY signal enters a high level, the FET 81 enters an on state so that a current flows through the secondary side diode in the photocoupler PC8 via the resistor R81. Therefore, when the primary side transistor in the photocoupler PC8 operates, the capacitor C8 is discharged so that a voltage of the SL terminal of the control unit 130 enters a low level. On the other hand, when the STANDBY signal enters a low level, the capacitor C8 is charged from the power supply voltage V2 via the resistor R8 so that the voltage of the SL terminal of the control unit 130 enters a high level. The control unit 130 determines switching of the output voltage Vout between a first voltage mode in which a voltage of 5 volts is output (SL terminal=high level) and a second voltage mode in which a voltage of 24 volts is output (SL terminal=low level) based on the voltage of the SL terminal.

[Configuration of Control Unit]

Figure 5B:
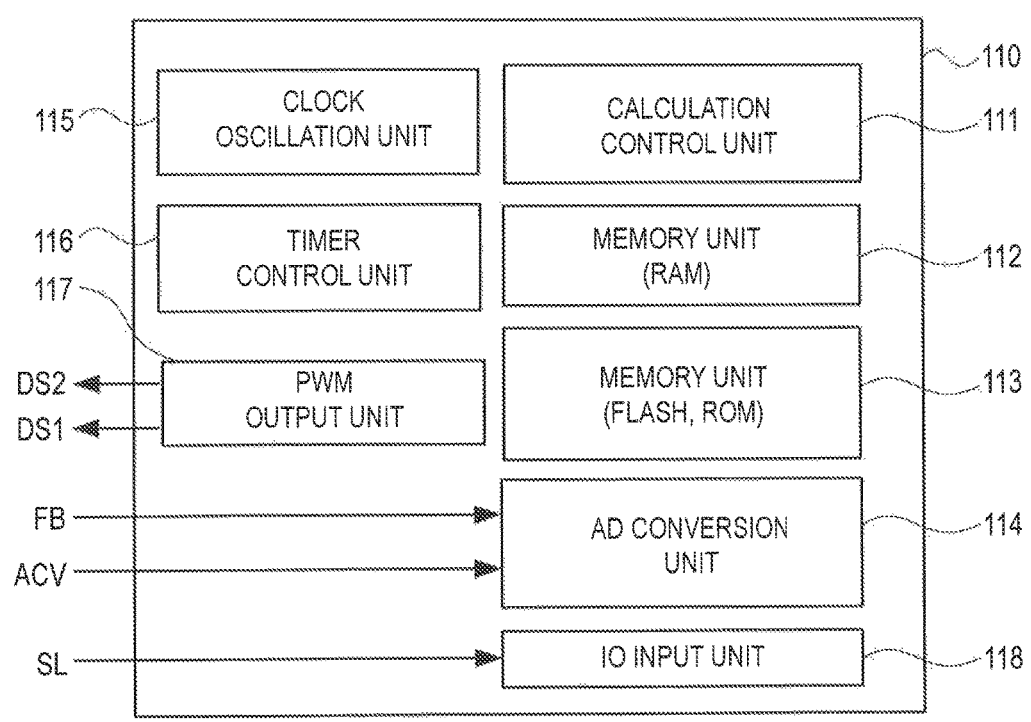
FIG. 5B is a schematic view of a control unit according to the second embodiment.

FIG. 5B is a schematic view of the control unit 130 according to the second embodiment. In the control unit 130, an IO input unit 118 is added to the control unit 110, to detect the voltage of the SL terminal. The same components as the components illustrated in FIG. 1B are assigned the same reference numerals, and hence description is not repeated.

[Transition Between First Voltage Mode and Second Voltage Mode]

Figure 6:
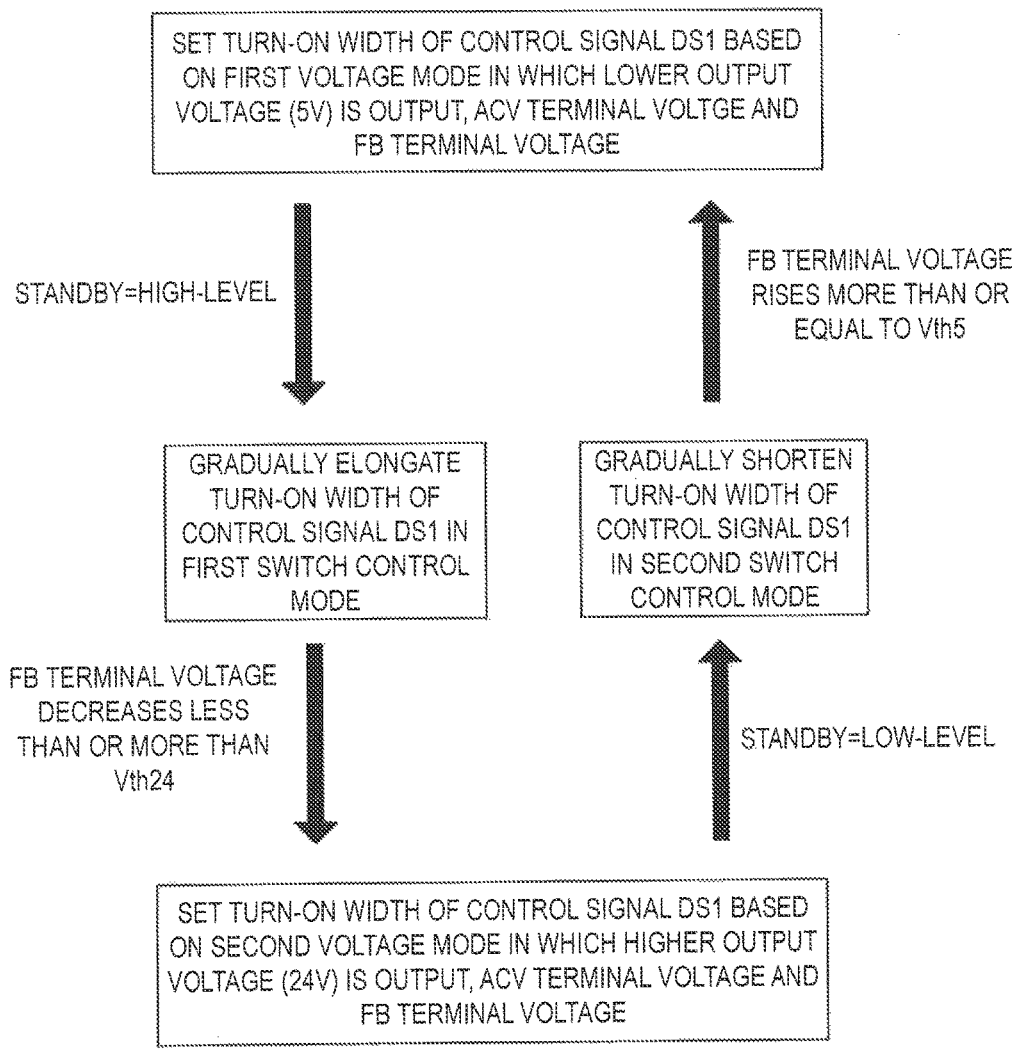
FIG. 6 is a diagram for describing state transition of a power supply apparatus according to the second embodiment.

FIG. 6 is a state transition diagram of the switching power supply 200 in switching control of the output voltage Vout. The switching power supply 200 can operate in a plurality of modes (a first voltage mode, a second voltage mode, a first switching control mode and a second switching control mode) described below. In the first voltage mode in which a low output voltage Vout (5 volts) as a first voltage is output, when it is detected that the STANDBY signal enters a high level, the control unit 130 operates in the following manner. That is, the control unit 130 shifts to the first switching control mode (a first switching state) to shift from the first voltage mode to the second voltage mode.

Figure 7A:
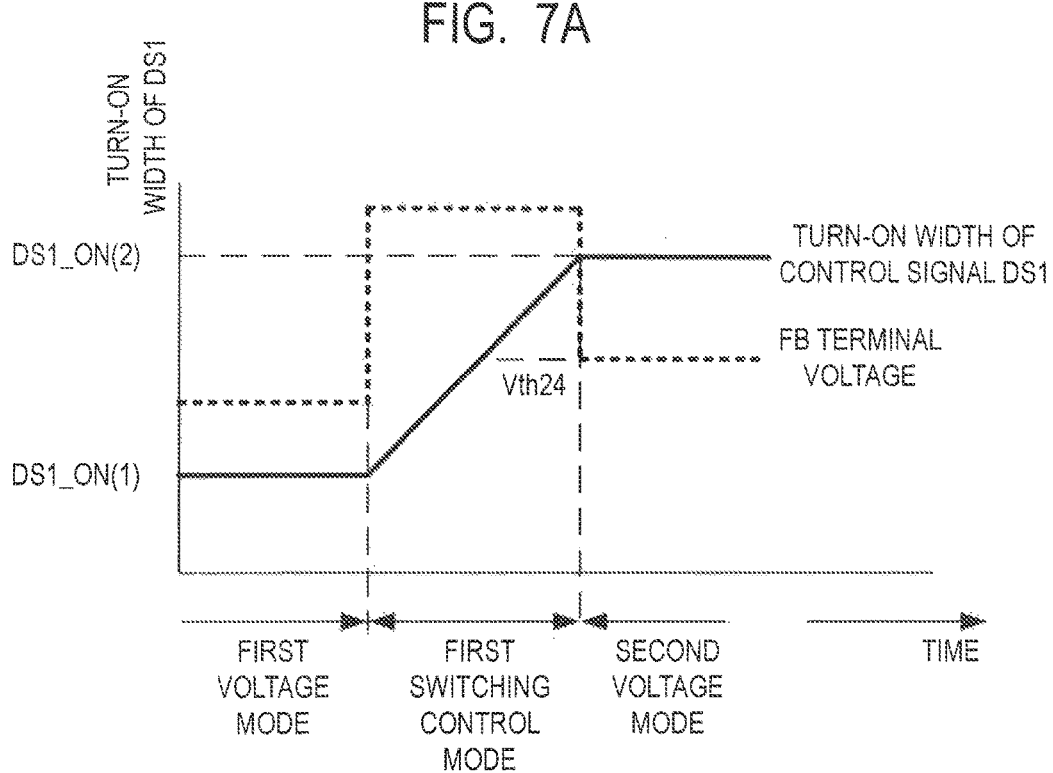
FIG. 7A is a diagram describing a method for switching control of an output voltage according to the second embodiment.

The control unit 130 increases the output voltage Vout by gradually lengthening a turn-on width of a control signal DS1 at a sufficiently low speed, as illustrated in FIG. 7A, in the first switching control mode. FIG. 7A is a graph plotting a time as a horizontal axis and the turn-on width of the control signal DS1 as a vertical axis. In FIG. 7A, the turn-on width of the control signal DS1 in the first voltage mode (5 volts) is DS1_ON(1), and the turn-on width of the control signal DS1 in the second voltage mode (24 volts) is DS1_ON(2). In the graph, an FB terminal voltage is also indicated by a broken line.

When the switching power supply 200 is operating in the first switching control mode to shift from the first voltage mode to the second voltage mode, the feedback unit 161 is ready to output a voltage of 24 volts (the second voltage mode) because the STANDBY signal is at a high level. Therefore, the output voltage Vout remains insufficient so that the FB terminal voltage increases to its maximum value. When the output voltage Vout reaches the voltage (24 volts) in the second voltage mode, the FB terminal voltage decreases. The control unit 130 shifts from the first switching control mode to the second voltage mode when the FB terminal voltage becomes a predetermined voltage value Vth24 or less (100 or less when represented by an AD conversion value). Thus, the switching power supply 200 shifts from the first voltage mode to the second voltage mode via the first switching control mode.

On the other hand, in the second voltage mode in which a high output voltage Vout (24 volts) as a second voltage is output, when it is detected that the STANDBY signal enters a low level, the control unit 130 operates in the following manner. That is, the control unit 130 shifts to the second switching control mode (a second switching state) to shift from the second voltage mode to the first voltage mode.

Figure 7B:
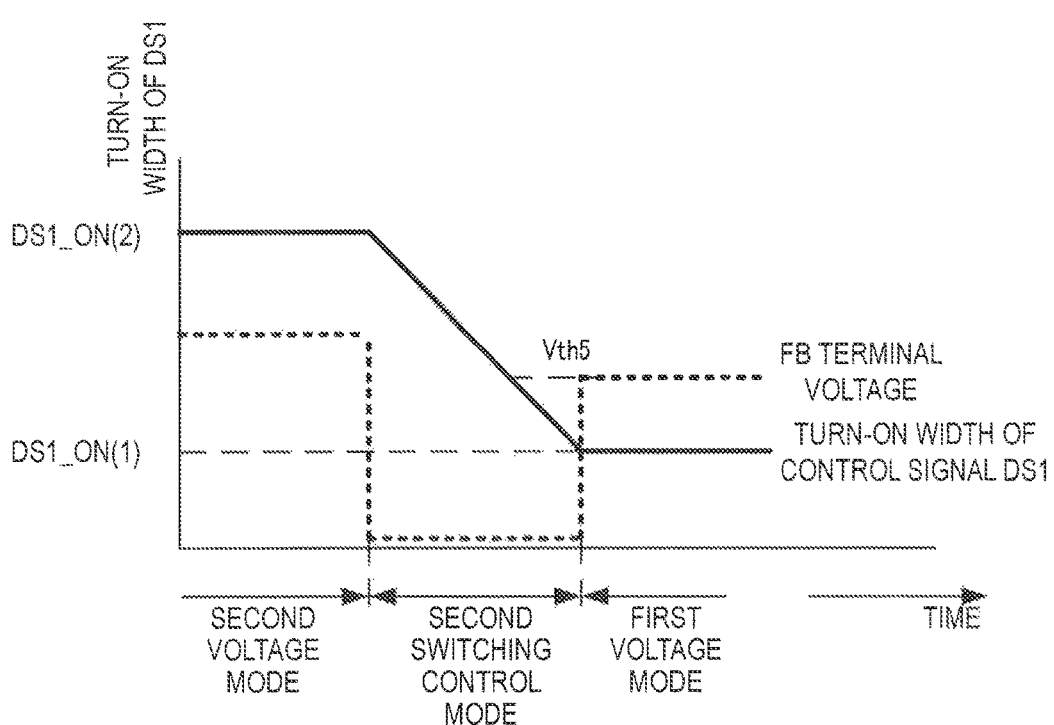
FIG. 7B is a diagram describing a method for switching control of an output voltage according to the second embodiment.

The control unit 130 decreases the output voltage Vout by gradually shortening a turn-on width of a control signal DS1 at a sufficiently low speed, as illustrated in FIG. 7B, in the second switching control mode. FIG. 7B is a similar graph to FIG. 7A. When the switching power supply 200 is operating in the second switching control mode to shift from the second voltage mode to the first voltage mode, the feedback unit 161 is ready to output a voltage of 5 volts (the first voltage mode) because the STANDBY signal is at a low level. Therefore, the output voltage Vout remains excessive so that the FB terminal voltage decreases to its lower-limit value. When the output voltage Vout decreases to the voltage (5 volts) in the first voltage mode, the FB terminal voltage increases. The control unit 130 shifts from the second switching control mode to the first voltage mode when the FB terminal voltage becomes a predetermined voltage value Vth5 or more (74 or more when represented by an AD conversion value). Thus, the switching power supply 200 shifts from the second voltage mode to the first voltage mode via the second switching control mode.

In the first switching control mode and the second switching control mode, a speed at which the turn-on width of the control signal DS1 is changed need not be a constant speed. The following may be performed to reduce a time required for the switching control mode while preventing overshooting or undershooting of the output voltage Vout, for example. For example, the speed at which the turn-on width of the control signal DS1 is changed may be set fast and slow, respectively, in a first half and a second half of each of the first switching control mode and the second switching control mode.

Thus, the control unit 130 is notified of switching between the first voltage mode and the second voltage mode in response to the STANDBY signal input from the outside, and a sequence of the switching control described in FIG. 6 and FIG. 7A and FIG. 7B is performed. Therefore, a rapid variation in the output voltage Vout and a variation in a switching waveform can be suppressed, and overshooting and undershooting of the output voltage Vout can be prevented.

If the resolution of the turn-on width of the control signal DS1 is low, a variation width of the output voltage Vout of the switching power supply 200 increases when the turn-on width of the control signal DS1 is changed by one stage in the sequence of the switching control. As illustrated in FIGS. 7A and 7B, the FB terminal voltage remains fixed to its upper-limit value or lower-limit value at the time of the end of the switching control mode, and a responsivity to feedback control may decrease when overshooting or undershooting has occurred. Therefore, at the time of the end of the switching control mode, the feedback control is not performed in time for the variation in the output voltage Vout by changing the turn-on width of the control signal DS1 by one stage. Accordingly, the voltage accuracy of the output voltage Vout may decrease.

In the switching control mode, an error diffusion control cycle P of the control signal DS1 is lengthened. Control is performed not to reduce the accuracy of the output voltage Vout by keeping the variation width of the output voltage Vout of the switching power supply 200 small when a control level of the control signal DS1 has varied by one stage.

Figure 9:
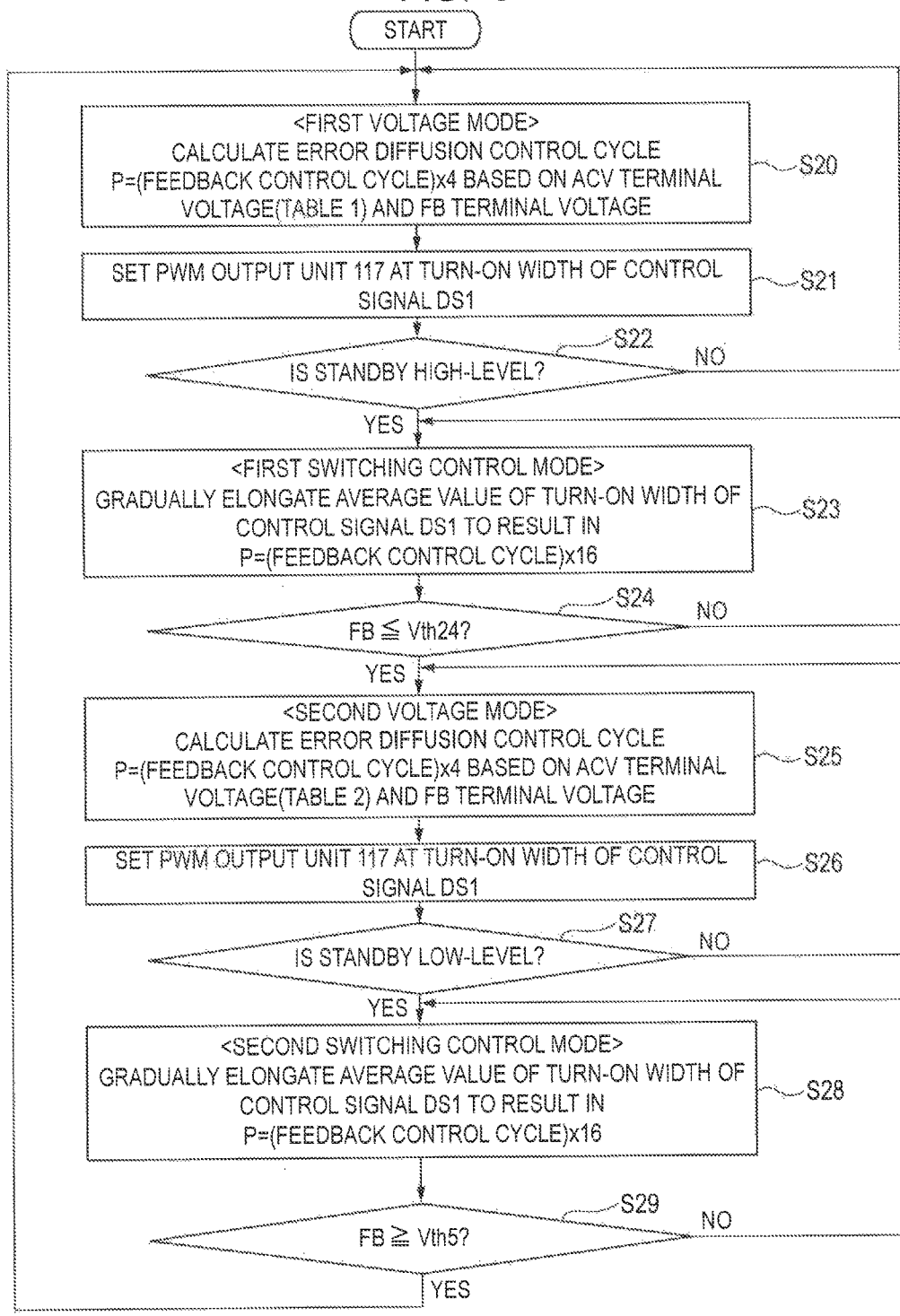
FIG. 9 is a flowchart illustrating control of a switching power supply according to the second embodiment.

Particularly in the second switching control mode illustrated in FIG. 7B, the FB terminal voltage increases at the time of the end of the second switching control mode. Accordingly, the responsivity to the feedback control decreases. The FB terminal voltage can be controlled at high speed in a primary side transistor of a photocoupler PC5 in the feedback unit 161 in only a direction in which the FB terminal voltage is decreased. To increase the FB terminal voltage, charging with a current flowing from a resistor R2 needs to be waited for. The responsivity is determined by a CR time constant between the resistor R2 and the capacitor C8 when the FB terminal voltage is increased. Therefore, a control method for lengthening the error diffusion control cycle P, described in FIG. 8 and FIG. 9, is effective particularly in control in the second switching control mode.

[Error Diffusion Control in Switching Control Mode]

FIG. 8 is a diagram for describing error diffusion control used in the first switching control mode and the second switching control mode. A method for the error diffusion control in the first voltage mode and the second voltage mode is the same as the method described in FIG. 2 in the first embodiment, and hence description is not repeated. That is, the error diffusion control is performed with a control value of a turn-on width of the control signal DS1 set as eight bits in the first voltage mode and the second voltage mode. FIG. 8(*i*) illustrates a control value (193 in decimal notation (0011000001 in binary notation)) of the turn-on width of the control signal DS1 which is gradually changed in each of the switching control modes. The control value of the turn-on width of the control signal DS1 in each of the switching control modes is a 10-bit control value obtained by expanding the 8-bit control value described in FIG. 2(*iii*) by two bits. In the second embodiment, control is performed with a resolution which is four times the control value of the turn-on width of the control signal DS1 described in FIG. 2(*iii*). Control to increase the control value of the turn-on width of the control signal DS1 by one stage for each predetermined time is performed in the first switching control mode, and control to decrease the control value of the turn-on width of the control signal DS1 by one stage for each predetermined time is performed in the second switching control mode.

FIG. 8(*ii*) illustrates a value (12 in decimal notation (001100 in binary notation)) obtained by extracting upper six bits of the control value of the turn-on width of the control signal DS1 (shifting right by four bits) and corresponding to a turn-on width of the control signal DS1 before the error diffusion control is performed. FIG. 8(*iii*) illustrates a remainder value (lower four bits) rounded down in calculation illustrated in FIG. 8(*i*), and is used for the error diffusion control (1 in decimal notation (0001 in binary notation)). FIG. 8(*iv*) illustrates a carry-over value calculated in a cycle of previous feedback control. For example, the carry-over value is 15 in decimal notation (1111 in binary notation).

FIG. 8(*v*) illustrates a value (16 in decimal notation (10000 in binary notation)) obtained by adding the remainder value illustrated in FIG. 8(*iii*) and the carry-over value in the calculation for the previous feedback control illustrated in FIG. 8(*iv*). 6 bit illustrated in FIG. 8(*vi*) as a most significant bit in FIG. 8(*v*) is an error diffusion value (1 in decimal notation) to be reflected on control of the turn-on width of the control signal DS1. A value illustrated in FIG. 8(*vii*) as lower four bits (7 bit to 10 bit) in FIG. 8(*v*) is a carry-over value (0 in decimal notation) used in a cycle of subsequent feedback control. FIG. 8(*viii*) illustrates a value (13 in decimal notation (001101 in binary notation)) obtained by adding the error diffusion value calculated in FIG. 8(*vi*) to the turn-on width of the control signal DS1 calculated in FIG. 8(*ii*) and corresponding to a turn-on width of the control signal DS1 after the error diffusion control. The calculations in FIG. 8(*i*) to FIG. 8(viii) are thus repeatedly performed for each feedback control cycle, to perform the error diffusion control.

When the error diffusion control is thus performed, 16 pulse widths of the control signal DS1 can be controlled in combination. The resolution (0.125 μsec) of the PWM output unit 117 becomes controllable every 0.0625 ($=\frac{1}{16}$) stages, as described in FIG. 2. Accordingly, the resolution of an average pulse width of the control signal DS1 can be increased to 16 times (7.813 nsec (=0.125/16)).

Each of the switching control modes is a mode in which the control value of the turn-on width of the control signal DS1 is simply increased or decreased regardless of the FB terminal voltage and the ACV terminal voltage, as described in FIG. 7A and FIG. 7B. Therefore, in each of the switching control modes, the control unit 130 can easily calculate the control value of the turn-on width of the control signal DS1 even when the control value of the turn-on width of the control signal DS1 is set to a 10-bit control value by expanding the control value in the first embodiment by two bits in FIG. 8(i). On the other hand, when calculation is also performed by expanding the control value of the turn-on width of the control signal DS1 to a 10-bit control value in the first voltage mode and the second voltage mode, an amount of the calculations performed by the control unit 130 increases. If a calculation speed of the control unit 130 is not sufficient, the feedback control cycle and the error diffusion cycle P are lengthened so that respective responsivities variations in the FB terminal voltage and the ACV terminal voltage may decrease, as described in FIG. 2.

As described in the second embodiment, the control value of the turn-on width of the control signal DS1 is expanded to a 10-bit control value only in each of the switching control modes, and the error diffusion cycle P is set long in the switching control mode. As a result, the average pulse width of the control signal DS1 can be controlled with a higher resolution only in each of the switching control modes without decreasing the responsivities in the first voltage mode and the second voltage mode. Accordingly, overshooting and undershooting, which occur at the time of the end of each of the switching control modes, are suppressed so that the accuracy of the output voltage Vout of the switching power supply 200 can be improved.

[Control of Switching Power Supply]

FIG. 9 is a flowchart describing control of the switching power supply 200 by the control unit 130. When an AC power supply 10 is connected to the switching power supply 200, the control unit 130 starts to control the control signals DS1 and DS2 in S20 and subsequent steps. In S20, the control unit 130 performs similar calculations for error diffusion control to the calculations for the error diffusion control described in FIG. 2 in the first embodiment based on an ACV terminal voltage input from an input voltage detection unit 170 and an FB terminal voltage input from the feedback unit 161. The error diffusion control performed in S20 is control in which a control value of a turn-on width of the control signal DS1 is set to eight bits. An error diffusion control cycle P as a second cycle becomes four times the feedback control cycle as the first cycle illustrated in FIG. 3A. The control unit 130 determines a correction value based on the ACV terminal voltage based on the conversion table in Table 1 described in the first embodiment.

In S21, the control unit 130 reflects a turn-on width of the control signal DS1 after the error diffusion control on a setting value of a PWM output unit 117. In S22, the control unit 130 determines whether a STANDBY signal is at a high level. If the control unit 130 determines in S22 that the STANDBY signal is at the high level, the processing proceeds to S23, to shift to the first switching control mode. If the control unit 130 determines in S22 that the STANDBY signal is at a low level, the processing returns to S20. In S20, the control unit 130 maintains the first voltage mode. In the first voltage mode, control in S20 to S22 is repeatedly performed.

In S23, the control unit 130 performs control to gradually lengthen the turn-on width of the control signal DS1 because the control is in the first switching control mode. More specifically, the control unit 130 performs control to gradually lengthen an average pulse width of the control signal DS1 (an average value in the error diffusion control cycle P of turn-on widths of the control signal DS1 in the feedback control cycles). As described in FIG. 8, the control unit 130 performs the error diffusion control by combining respective pulse signals in 16 feedback control cycles. The error diffusion control performed in S23 is control in which a control value of the turn-on width of the control signal DS1 is set to a 10-bit control value by expanding the control value in the first voltage mode by two bits. In the error diffusion control performed in S23, a carry-over value is obtained by expanding a carry-over value in the first voltage mode by two bits. Therefore, the error diffusion control cycle P as the first cycle becomes 16 times the feedback control cycle as the second cycle, and becomes four times the error diffusion control cycle P in the first voltage mode.

In S24, the control unit 130 determines whether the FB terminal voltage becomes Vth24 or less (100 or less when represented by an AD conversion value at an FB terminal). If the control unit 130 determines in S24 that the FB terminal voltage is Vth24 or less, the first switching control mode is finished, and the processing proceeds to S25. If the control unit 130 determines in S24 that the FB terminal voltage is more than Vth24, the processing returns to S23. In step S23, the control unit 130 continues the first switching control mode.

In S25, the control unit 130 performs similar calculations for error diffusion control to the calculations for the error diffusion control described in FIG. 2 in the first embodiment based on the ACV terminal voltage and the FB terminal voltage. The error diffusion control performed in S25 is control in which a control value of the turn-on width of the control signal DS1 is set to eight bits. The error diffusion control cycle P becomes four times the feedback control cycle illustrated in FIG. 3A. The second voltage mode is a control mode in which a voltage value of the output voltage Vout is high. The turn-on width of the control signal DS1 in the second voltage mode needs to be made larger than the turn-on width in the first voltage mode. A correction value based on the ACV terminal voltage is determined based on a conversion table in Table 2.

TABLE 2

CORRECTION VALUE OF TURN-ON WIDTH OF CONTROL SIGNAL DS1 IN SECOND VOLTAGE MODE IN WHICH HIGH VOLTAGE (24 VOLTS) IS OUTPUT

| VOLTAGE EFFECTIVE VALUE OF AC POWER SUPPLY 10 (Vrms) | CORRECTION VALUE BASED ON ACV TERMINAL VOLTAGE |
| --- | --- |
| 126.7 | −8 |
| 123.3 | −13 |
| 120.0 | −18 |
| 116.7 | −27 |
| 113.3 | −37 |
| 110.0 | −48 |
| 106.7 | −60 |
| 103.3 | −74 |
| 100.0 | −90 |

As a result, a correction value for making the turn-on width of the control signal DS1 in the second voltage mode larger than the turn-on width in the first voltage mode is set even when the FB terminal voltage is the same. Table 2 is a similar table to Table 1. If a voltage effective value of the AC power supply 10 detected by the input voltage detection unit 170 is 113.3 Vrms, for example, the correction value is 29 in Table 1 while being −37 in Table 2. Therefore, the control value of the turn-on width of the control signal DS1 becomes larger than the control value in the first embodiment from the equation (1) in the first embodiment. In S26, the control unit 130 reflects the turn-on width of the control signal DS1 after the error diffusion control on the setting value of the PWM output unit 117.

In S27, the control unit 130 determines whether the STANDBY signal is at a low level. If the control unit 130 determines in S27 that the STANDBY signal is at the low level, the processing proceeds to S28, to shift to the second switching control mode. If the control unit 130 determines in S27 that the STANDBY signal is at a high level, the processing returns to S25. In S25, the control unit 130 maintains the second voltage mode. In the second voltage mode, control in S25 to S27 is repeatedly performed.

In S28, the control unit 130 performs control to gradually shorten an average value (an average pulse width) of turn-on widths of the control signal DS1 because the control is in the second switching control mode. As described in FIG. 8, the control unit 130 performs the error diffusion control by combining respective pulse signals in 16 feedback control cycles. The error diffusion control performed in S28 is control in which a control value of the turn-on width of the control signal DS1 is set to a 10-bit control value by expanding the control value in the second voltage mode by two bits. The error diffusion control cycle P as the second cycle becomes 16 times the feedback control cycle as the first cycle. In S29, the control unit 130 determines whether the FB terminal voltage is Vth5 or more (74 or more when represented by an AD conversion value at the FB terminal). Vth5 is less than Vth24 (Vth5<Vth24). If the control unit 130 determines in S29 that the FB terminal voltage is Vth5 or more, the second switching control mode is finished, and the processing returns to S20. If the control unit 130 determines in S29 that the FB terminal voltage is less than Vth5, the processing returns to S28. In S28, the control unit 130 continues the second switching control mode.

As described above, in the switching power supply 200 including the first voltage mode (Vout=5 volts), the second voltage mode (Vout=24 volts) and the switching control modes, the error diffusion control cycle P is set longer in the switching control mode than the error diffusion cycle P in each of the voltage modes. More specifically, the respective numbers of feedback control cycles included in the error diffusion control cycles P in the first and second switching control modes are made larger than the respective numbers of feedback control cycles included in the error diffusion control cycles P in the first and second voltage modes. Therefore, the resolution of the control signal DS1 is increased, and overshooting and undershooting at the time of the end of each of the switching control modes can be inhibited from occurring. In the switching power supply 200 according to the second embodiment, an active clamp-type power supply including two switching elements (FET 2 and FET 3) has been described. However, in a switching power supply (e.g., a forward power supply) of a type in which an output voltage is determined depending on a turn-on time of the switching element (FET), the switching element is also applicable to one power supply.

As described above, according to the second embodiment, the accuracy, efficiency, and responsivity of the output voltage of the switching power supply can be improved regardless of the operation mode of the switching power supply.

[Third Embodiment]

The switching power supplies 101 and 200 described in the first and second embodiments are applicable as a low-voltage power supply, i.e., a power supply configured to supply power to a controller (control unit) and a driving unit such as a motor in the image forming apparatus, for example. A configuration of the image forming apparatus to which the switching power supplies 101 and 200 according to the first and second embodiments are applied will be described below.

[Configuration of Image Forming Apparatus]

Figure 10:
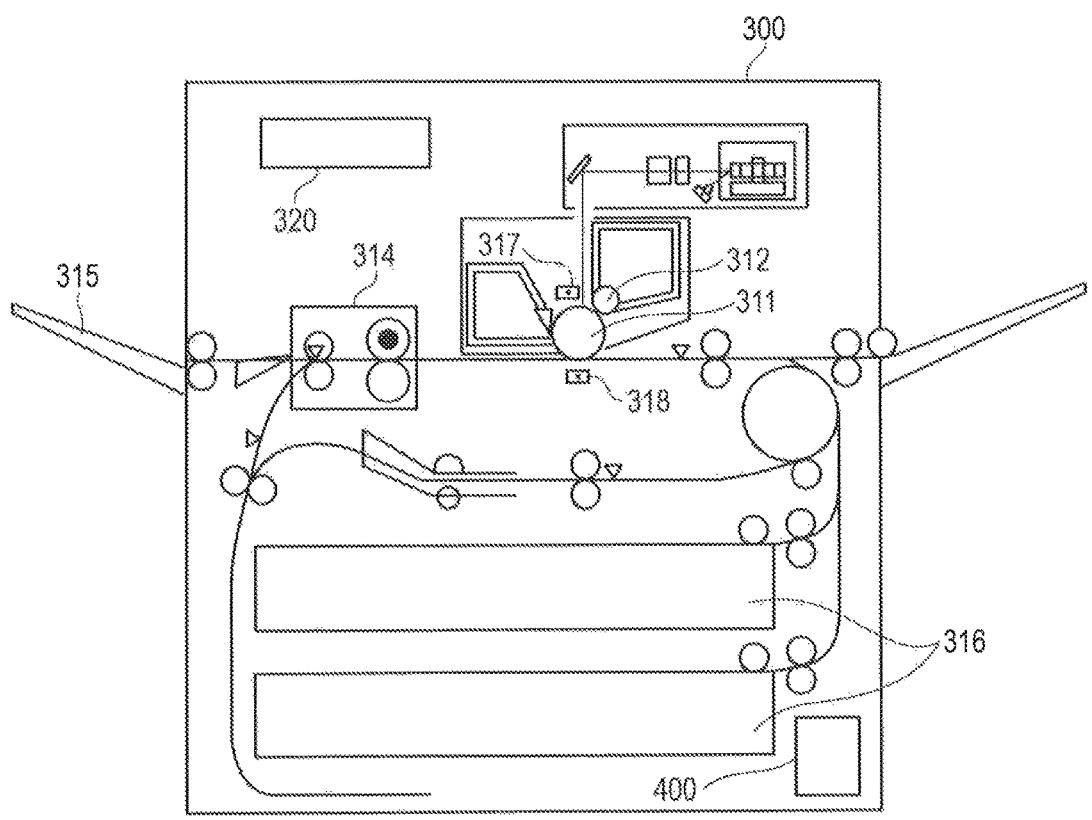
FIG. 10 is a diagram illustrating a configuration of an image forming apparatus according to a third embodiment.

A laser beam printer will be described as an example of the image forming apparatus. FIG. 10 illustrates a schematic configuration of the laser beam printer as an example of an electrophotographic printer. A laser beam printer 300 includes a photosensitive drum 311 as an image bearing member on which an electrostatic latent image is formed, a charge unit 317 (a charge device) configured to uniformly charge the photosensitive drum 311, and a developing unit 312 (a developing device) configured to develop the electrostatic latent image formed on the photosensitive drum 311 with toner. A toner image developed on the photosensitive drum 311 is transferred onto a sheet (not illustrated) as a recording material supplied from a cassette 316 by a transfer unit 318 (a transfer device), and the toner image transferred on the sheet is fixed by a fixing device 314 and is discharged onto a tray 315. The photosensitive drum 311, the charge unit 317, the developing unit 312, and the transfer unit 318 constitute an image forming unit. The laser beam printer 300 includes a power supply apparatus 400 as the respective switching power supplies 101 and 200 described in the first and second embodiments. An image forming apparatus to which the power supply apparatus 400 is applicable is not limited to the image forming apparatus illustrated in FIG. 10, and may be an image forming apparatus including a plurality of image forming units, for example. Further, the image forming apparatus may be an image forming apparatus including a primary transfer unit configured to transfer a toner image on the photosensitive drum 311 onto an intermediate transfer belt and a secondary transfer unit configured to transfer the toner image on the intermediate transfer belt onto a sheet.

The laser beam printer 300 includes a controller 320 configured to control an image forming operation by the image forming unit and a sheet conveyance operation, and the power supply apparatus 400 as the respective switching power supplies 101 and 200 described in the first and second embodiments supplies power to a controller 320, for example. The power supply apparatus 400 as the switching power supply 200 described in the second embodiment supplies power to a driving unit such as a motor configured to drive various types of rollers configured to rotate the photosensitive drum 311 or convey the sheet.

If the power supply apparatus 400 is the switching power supply 200 according to the second embodiment, the image forming apparatus according to the third embodiment can operate in a mode corresponding to the first voltage mode and the second voltage mode. The controller 320 as a control unit outputs a STANDBY signal to the feedback unit 161 and the switching notification unit 180 in the switching power supply 200. In the first voltage mode (a 5-volt output), for example, the image forming apparatus is in a standby state (e.g., a power saving mode or a standby mode) in which power saving is realized, and can reduce a load to reduce power consumption by supplying power to only the controller 320, for example. On the other hand, in the second voltage mode (a 24-volt output), the image forming apparatus is ready to perform an image forming operation.

As described above, according to the third embodiment, the accuracy, efficiency, and responsivity of an output voltage of the switching power supply can be improved regardless of the operation mode of the switching power supply.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-219285, filed Nov. 14, 2017, which is hereby incorporated by reference herein in its entirety.

What is claimed is:

1. A power supply apparatus having operation states, comprising:
   a transformer including a primary winding and a secondary winding;
   at least one switching element provided on a primary side of the transformer, the at least one switching element configured to perform a switching operation to convert an input voltage in which an alternating-current voltage is smoothed and rectified to output an output voltage from a secondary side of the transformer; and
   a control unit configured to determine a turn-on time of a pulse signal for controlling the switching element for each of first cycles so that the turn-on time of one first cycle is to be different from the turn-on time of another first cycle, and perform an error diffusion control in which a change value of the turn-on time of the pulse signal for each of second cycles each including the first cycles becomes smaller than a change value of the turn-on time of the pulse signal for each of the first cycles,
   wherein the control unit is configured to change the operation states of the power supply apparatus into any one of a first state where the pulse signal is continuously output and a second state where an intermittent operation for repeating a switching period during which the pulse signal is output and a halt period during which the output of the pulse signal is stopped is performed, and
   wherein the control unit controls the second cycle in the second state to be longer than the second cycle in the first state.

2. A power supply apparatus according to claim 1, wherein the change value of the turn-on time of the pulse signal for each of the second cycles each including the first cycles is a change value of an average value of turn-on times of pulse signals in the second cycles.

3. A power supply apparatus according to claim 1, comprising a feedback unit configured to output a feedback voltage to the control unit to perform feedback control of the output voltage,
   wherein the control unit sets a cycle in which the feedback control is performed at each of the first cycles in the first state and sets a cycle in which the intermittent operation is performed at each of the first cycles in the second state, to control each of the second cycles in the second state to be longer than each of the second cycles in the first state.

4. A power supply apparatus according to claim 3, comprising a detection unit configured to detect the input voltage,
   wherein the control unit determines the turn-on time of the pulse signal based on the feedback voltage and the input voltage detected by the detection unit.

5. A power supply apparatus according to claim 4, wherein the control unit corrects the input voltage detected by the detection unit based on the alternating-current voltage when determining the turn-on time of the pulse signal.

6. A power supply apparatus according to claim 3, wherein the control unit performs switching between the first state and the second state based on the feedback voltage.

7. A power supply apparatus according to claim 1, wherein the operation states include a first voltage state where the output voltage is a first voltage, a second voltage state where the output voltage is a second voltage higher than the first voltage, a first switching state through which a voltage state transits from the first voltage state to the second voltage state, and a second switching state through which a voltage state transits from the second voltage state to the first voltage state, and
   the control unit controls each of the second cycles in the first switching state and the second switching state longer than each of the second cycles in the first voltage state and the second voltage state.

8. A power supply apparatus according to claim 7, comprising a feedback unit configured to output a feedback voltage to the control unit to perform feedback control of the output voltage,
   wherein the control unit sets a cycle in which the feedback control is performed at each of the first cycles and controls a number of the first cycles included in the second cycles in the first switching state and the second switching state to be larger than a number of the first cycles included in the second cycles in the first voltage state and the second voltage state, to control each of the second cycles in the first switching state and the second switching state to be longer than each of the second cycles in the first voltage state and the second voltage state.

9. A power supply apparatus according to claim 8, wherein the control unit gradually increases the turn-on time of the pulse signal in the first switching state and gradually decreases the turn-on time of the pulse signal in the second switching state.

10. A power supply apparatus according to claim 1, wherein the operation states include a first voltage state where the output voltage is a first voltage, a second voltage state where the output voltage is a second voltage higher than the first voltage, and a second switching state through which a voltage state transits from the second voltage state to the first voltage state, and the control unit controls the second cycle in the second switching state to be longer than each of the second cycles in the first voltage state and the second voltage state.

11. A power supply apparatus according to claim 10, comprising a feedback unit configured to output a feedback voltage to the control unit to perform feedback control of the output voltage,
   wherein the control unit sets a cycle in which the feedback control is performed at each of the first cycles and controls a number of the first cycles included in the second cycle in the second switching state to be larger than a number of the first cycles included in the second cycles in the first voltage state and the second voltage state, to control each of the second cycles in the second switching state to be longer than each of the second cycles in the first voltage state and the second voltage state.

12. A power supply apparatus according to claim 11, wherein the control unit gradually decreases the turn-on time of the pulse signal in the second switching state.

13. A power supply apparatus according to claim 8, comprising a detection unit configured to detect the input voltage,
 wherein the control unit determines the turn-on time of the pulse signal in the first voltage state and the second voltage state based on the feedback voltage and the input voltage detected by the detection unit.

14. A power supply apparatus according to claim 13, wherein in a case where the turn-on time of the pulse signal in the first voltage state and the second voltage state, the control unit corrects the input voltage detected by the detection unit based on the alternating-current voltage.

15. A power supply apparatus according to claim 1, wherein the operation states include a light load state and a heavy load state whose load is larger than a load in the light load state, and the second cycle in the light load state is longer than the second cycle in the heavy load state.

16. An image forming apparatus comprising:
 an image forming unit configured to form an image on a recording material; and
 a power supply apparatus configured to supply power to the image forming unit,
 wherein the power supply apparatus comprises:
 a transformer including a primary winding and a secondary winding;
 at least one switching element provided on a primary side of the transformer, the at least one switching element configured to perform a switching operation to convert an input voltage in which an alternating-current voltage is smoothed and rectified to output an output voltage from a secondary side of the transformer; and
 a control unit configured to determine a turn-on time of a pulse signal for controlling the switching element for each of first cycles so that the turn-on time of one first cycle is to be different from the turn-on time of another first cycle, and perform an error diffusion control in which a change value of the turn-on time of the pulse signal for each of second cycles each including the first cycles becomes smaller than a change value of the turn-on time of the pulse signal for each of the first cycles,
 wherein the control unit is configured to change the operation states of the power supply apparatus into any one of a first state where the pulse signal is continuously output and a second state where an intermittent operation for repeating a switching period during which the pulse signal is output and a halt period during which the output of the pulse signal is stopped is performed,
 wherein the control unit controls the second cycle in the second state to be longer than the second cycle in the first state.

17. An image forming apparatus according to claim 16, comprising a control unit configured to control the image forming unit and the power supply apparatus,
 wherein the control unit outputs a signal for switching a voltage state between the first voltage state and the second voltage state to the power supply apparatus, and
 the power supply apparatus includes a voltage switching unit configured to switch a voltage between the first voltage and the second voltage in response to the signal input by the control unit.

18. An image forming apparatus according to claim 16, wherein the operation states include a light load state and a heavy load state whose load is larger than a load in the light load state, and the second cycle in the light load state is longer than the second cycle in the heavy load state.

19. An image forming apparatus according to claim 18, wherein the light load state is one of a power saving state and a standby state of the image forming apparatus, and the heavy load state is a state under an image forming operation.

* * * * *